United States Patent
Tomida et al.

(10) Patent No.: US 10,350,760 B2
(45) Date of Patent: Jul. 16, 2019

(54) ROBOT, ROBOT CONTROL SYSTEM, ROBOT CONTROL METHOD, AND NON-TRANSITORY COMPUTER-READABLE RECORDING MEDIUM

(71) Applicant: CASIO COMPUTER CO., LTD., Tokyo (JP)

(72) Inventors: Takahiro Tomida, Hamura (JP); Akira Kashio, Musashino (JP); Mai Yatsuka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 219 days.

(21) Appl. No.: 15/446,473

(22) Filed: Mar. 1, 2017

(65) Prior Publication Data

US 2017/0368689 A1  Dec. 28, 2017

(30) Foreign Application Priority Data

Jun. 23, 2016 (JP) .................................. 2016-124323

(51) Int. Cl.
*B25J 9/00* (2006.01)
*B25J 11/00* (2006.01)

(52) U.S. Cl.
CPC ......... *B25J 11/0005* (2013.01); *B25J 9/0003* (2013.01); *B25J 9/0084* (2013.01); *G05B 2219/40202* (2013.01)

(58) Field of Classification Search
CPC .... B25J 11/0005; B25J 9/0084; B25J 9/0003; G05B 2219/40202; G06K 9/00288; G06K 9/00228; G06K 9/00302; G06F 3/013; G06F 3/011; G06F 3/012; G06F 3/167

USPC .................. 700/248; 446/175, 484, 297, 353
See application file for complete search history.

(56) References Cited

U.S. PATENT DOCUMENTS

| | | | | |
|---|---|---|---|---|
| 2002/0081937 A1* | 6/2002 | Yamada | ................... | A63H 3/48 446/175 |
| 2005/0215171 A1* | 9/2005 | Oonaka | ..................... | A63H 3/28 446/301 |
| 2005/0216126 A1* | 9/2005 | Koselka | ................... | B25J 5/007 700/259 |
| 2017/0357256 A1* | 12/2017 | Mizutani | .............. | B25J 11/0005 |

FOREIGN PATENT DOCUMENTS

| | | |
|---|---|---|
| JP | 2002-307354 A | 10/2002 |
| JP | 2009-131928 A | 6/2009 |

OTHER PUBLICATIONS

Notification of Reasons for Refusal dated Dec. 5, 2017 received in Japanese Patent Application No. JP 2016-124323 together with an English language translation.

* cited by examiner

*Primary Examiner* — Dalena Tran
(74) *Attorney, Agent, or Firm* — Scully Scott Murphy & Presser

(57) ABSTRACT

Each robot effectively appeals its own device even when multiple robots are present in surroundings. A robot comprises a person detector, an appeal permitter, and a movement controller. The person detector detects a person. The appeal permitter permits execution of an appealing movement attracting interest of a person. The movement controller executes the appealing movement when the person detector detects a person and execution of the appealing movement is permitted by the appeal permitter.

21 Claims, 14 Drawing Sheets

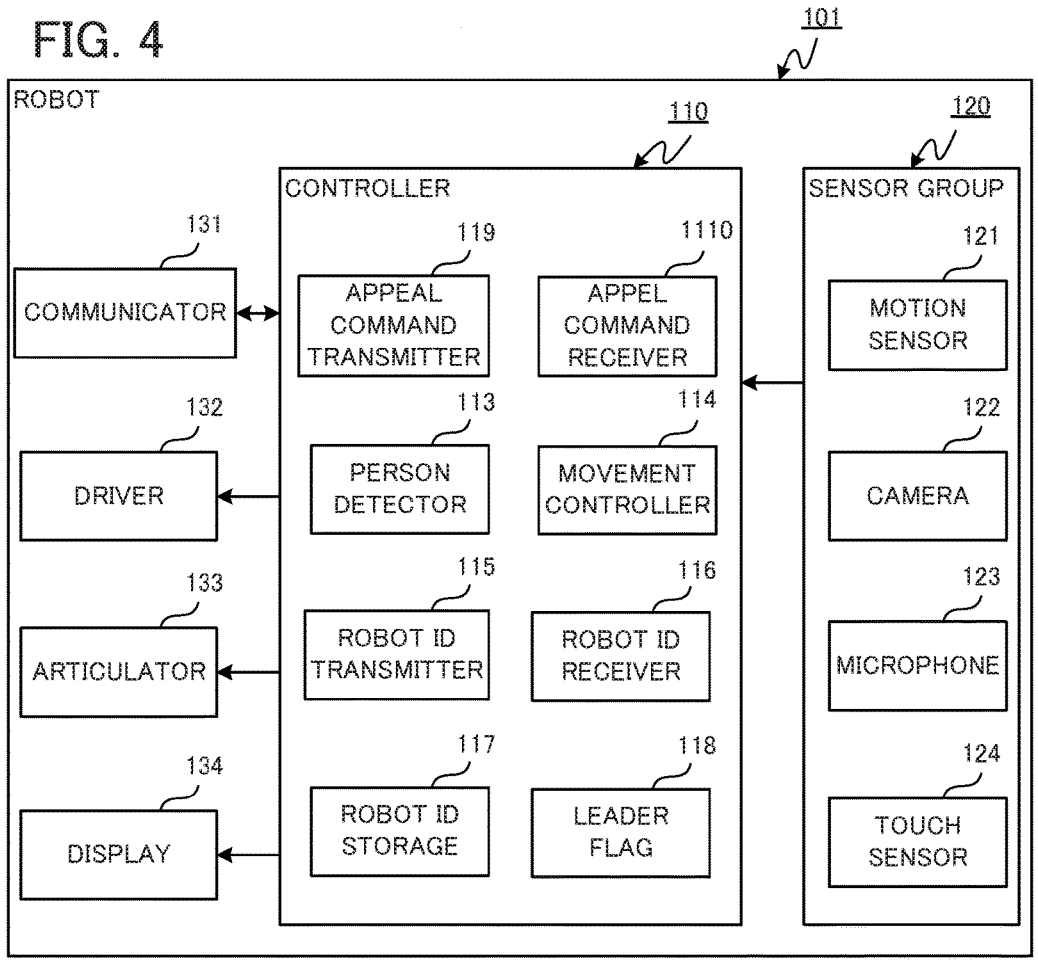

| | TYPE | ID | SENSOR INFORMATION | PERSON DETECTION | DEGREE OF INTEREST | ... |
|---|---|---|---|---|---|---|
| 1 | DOG | 0x001122012345 | ... | 1 | 0.92 | ... |
| 2 | CAT | 0x001122012356 | ... | 1 | 0.41 | ... |
| 3 | BEAR | 0x001122012378 | ... | 1 | 0.63 | ... |
| ... | ... | ... | ... | ... | ... | ... |

ROBOT INFORMATION STORAGE

| | IDENTIFICATION NUMBER | FEATURES DATA | LAST UPDATE DATE/TIME | CUMULATIVE NUMBER OF TIMES | DEGREE OF INTEREST | ... |
|---|---|---|---|---|---|---|
| 1 | 1001 | ... | 16/6/8 19:10 | 58 | DOG:0.92、CAT:0.41、... | ... |
| 2 | 2103 | ... | 16/4/3 15:30 | 3 | DOG:0.81、CAT:0.78、... | ... |
| 3 | 3125 | ... | 16/5/5 10:15 | 11 | DOG:0.32、CAT:0.93、... | ... |
| ... | ... | ... | ... | ... | ... | ... |

PERSON INFORMATION STORAGE

ROBOT, ROBOT CONTROL SYSTEM, ROBOT CONTROL METHOD, AND NON-TRANSITORY COMPUTER-READABLE RECORDING MEDIUM

CROSS-REFERENCE TO RELATED APPLICATION

This application claims the benefit of Japanese Patent Application No. 2016-124323, filed on Jun. 23, 2016, the entire disclosure of which is incorporated by reference herein.

FIELD

This application relates generally to a robot, a robot control system, a robot control method, and a non-transitory computer-readable recording medium.

BACKGROUND

In recent years, as home robots, robots capable of communicating with the user and pet robots have been developed. Moreover, Patent Literature 1 discloses an electronic toy (home robot) that is automatically activated as a person approaches and starts an operation so as to be able to appeal its own device. Here, appealing means making a movement attracting interest of a person such as moving the head to look like gazing at a person, wagging the tail, moving toward a person, wearing a look of joy, and calling.

Patent Literature 1: Unexamined Japanese Patent Application Kokai Publication No. 2002-307354.

SUMMARY

In order to achieve the above objective, the robot according to the present disclosure comprises:
a detector detecting information on surroundings;
a driver driving the robot; and
a controller,
wherein the controller
determines whether a person is around based on the information detected by the detector,
permits execution of an appealing movement attracting interest of the person when determined that a person is around in the determination, and
controls the driver to execute the appealing movement when execution of the appealing movement is permitted and there is no other robot executing the appealing movement.

BRIEF DESCRIPTION OF THE DRAWINGS

A more complete understanding of this application can be obtained when the following detailed description is considered in conjunction with the following drawings, in which:

FIG. 4 is a block diagram showing the functional configuration of the robot according to Embodiment 2 of the present disclosure;

FIG. 5A is a chart showing exemplary initial values stored in the robot identification (ID) storage according to Embodiment b 2;

FIG. 5B is a chart showing other exemplary data stored in the robot ID storage according to Embodiment 2;

DETAILED DESCRIPTION

Embodiments of the present disclosure will be described below with reference to the drawings. Here, the same or corresponding parts are referred to by the same reference numbers in the figures.

Embodiment 1

Figure 1:
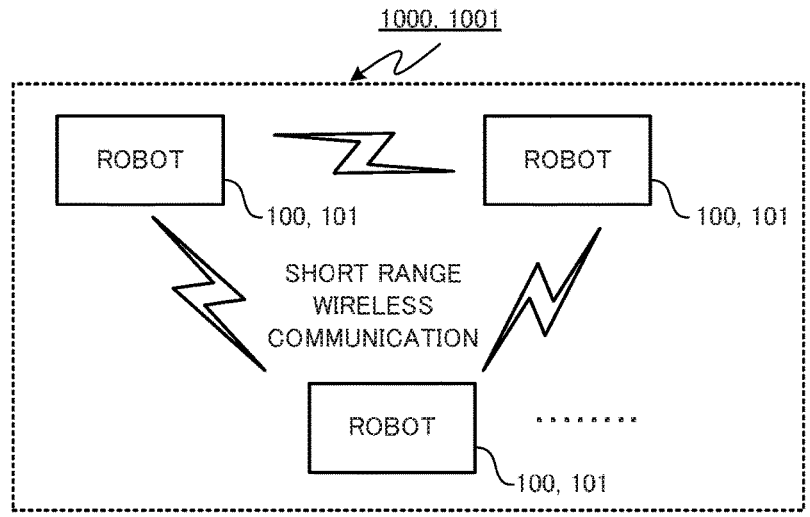
FIG. 1 is a diagram showing an exemplary configuration of the robot control system according to Embodiment 1 of the present disclosure.

As shown in FIG. 1, a robot control system 1000 according to Embodiment 1 of the present disclosure comprises multiple robots 100. Then, the multiple robots 100 mutually communicate through short range wireless communication.

Figure 2:
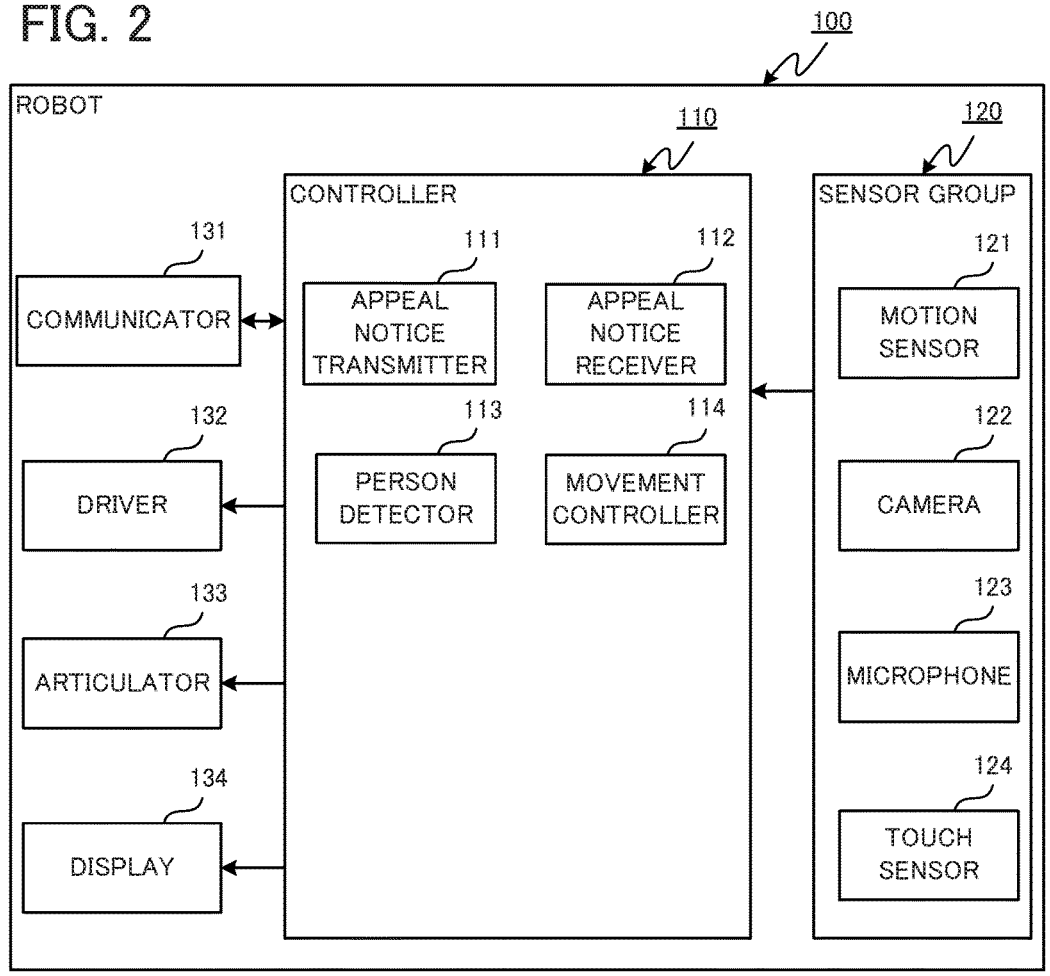
FIG. 2 is a block diagram showing the functional configuration of the robot according to Embodiment 1.

The functional configuration of the robot 100 according to Embodiment 1 will be described below. As shown in FIG. 2, the robot 100 comprises a controller 110, a sensor group 120, a communicator 131, a driver 132, an articulator 133, and a display 134.

The controller 110 comprises a central processing unit (CPU), a read only memory (ROM), a random access memory (RAM), and the like, and controls the entire operation of the robot 100. The CPU executes programs stored in the ROM to realize the functions of the parts (an appeal notice transmitter 111, an appeal notice receiver 112, a person detector 113, and a movement controller 114) provided to the controller 110. Moreover, the controller 110 has the capability of multithreading and can execute multiple threads (different processing flows) in parallel. Moreover, the controller 110 comprises a not-shown timer.

The sensor group 120 comprises a motion sensor 121, a camera 122, a microphone 123, and a touch sensor 124, and detects information on the surroundings of the robot 100. The motion sensor 121 is, for example, an infrared sensor and detects a person being around. The camera 122 captures images of the surroundings. The microphone 123 detects sound occurring in the surroundings. The touch sensor 124 detects contacts. In other words, the touch sensor 124 detects the robot 100 being, for example, hugged or stroked by a person.

The communicator 131 comprises a radio frequency (RF) circuit, a base band (BB) circuit, an antenna, and the like, and performs short range wireless communication with the other robots 100. As a communication standard used in the short range wireless communication, for example, the Bluetooth (registered trademark) Low Energy (BLE, hereafter) can be used. The BLE is a standard (mode) designed with intent to pursue low power consumption and low cost in the Bluetooth (registered trademark), which is a short range wireless communication standard.

The driver 132 comprises, for example, a motor, gears, and the like, and moves the parts (the head, legs, tail, and the like) of the robot. The articulator 133 comprises a speaker and outputs, for example, calls, sound, and the like.

The display 134 comprises, for example, a light emitting diode (LED), and outputs blinking light and the like.

The functional configuration of the controller 110 of the robot 100 will be described next. The controller 110 functionally comprises an appeal notice transmitter 111, an appeal notice receiver 112, a person detector 113, and a movement controller 114.

The appeal notice transmitter 111 transmits a broadcast packet of an appeal notice via the communicator 131. The appeal notice is categorized into two types, a notice of appeal in progress to notify the other robots 100 around that its own device is executing an appealing movement and a notice of finish of appeal to notify the other robots 100 around that the appealing movement is finished. The appealing movement means movements attracting interest of a person such as moving the head to look like gazing at a person, wagging the tail, moving toward a person, wearing a look of joy, outputting calls or sound through the articulator 133, and blinking light using the display 134.

The appeal notice receiver 112 receives the appeal notice broadcast packet transmitted by another robot via the communicator 131. The controller 110 does not permit its own device any appealing movement from reception by the appeal notice receiver 112 of a notice of appeal in progress transmitted by another robot to reception of a notice of finish of appeal transmitted by the other robot. Then, after the appeal notice transmitter 111 transmits a notice of appeal in progress, the controller 110 permits its own device an appealing movement. In this way, only one robot exclusively makes an appealing movement. As described above, the controller 110 cooperates with the appeal notice transmitter 111 and the appeal notice receiver 112 to function as the appeal permitter.

The person detector 113 detects a person being around based on information detected by various sensors provided to the sensor group 120. For example, if the motion sensor 121 detects the presence of a person, the person detector 113 judges that a person is around according to the value detected by the motion sensor 121. Moreover, the person detector 113 judges that a person is around when image recognition reveals that an image captured by the camera 122 is an image of a person or when image recognition reveals a sight line of a person. Moreover, the person detector 113 judges that a person is around when sound recognition on sound acquired by the microphone 123 reveals human voice. Moreover, the person detector 113 analyzes detection values of the touch sensor 124 and judges that a person is around when determined to be hugged or stroked by a person.

Here, in the case of judging whether a person is around through image recognition, it is possible to determine whether one person is around or multiple persons are around. Then, when determined that multiple persons are around, it may be possible to identify a sight line through image recognition and control the movement so as to make an appealing movement to the person whose eye is caught.

The movement controller 114 controls the driver 132, the articulator 133, and the display 134 to make the robot execute various movements including appealing movements.

Figure 3:
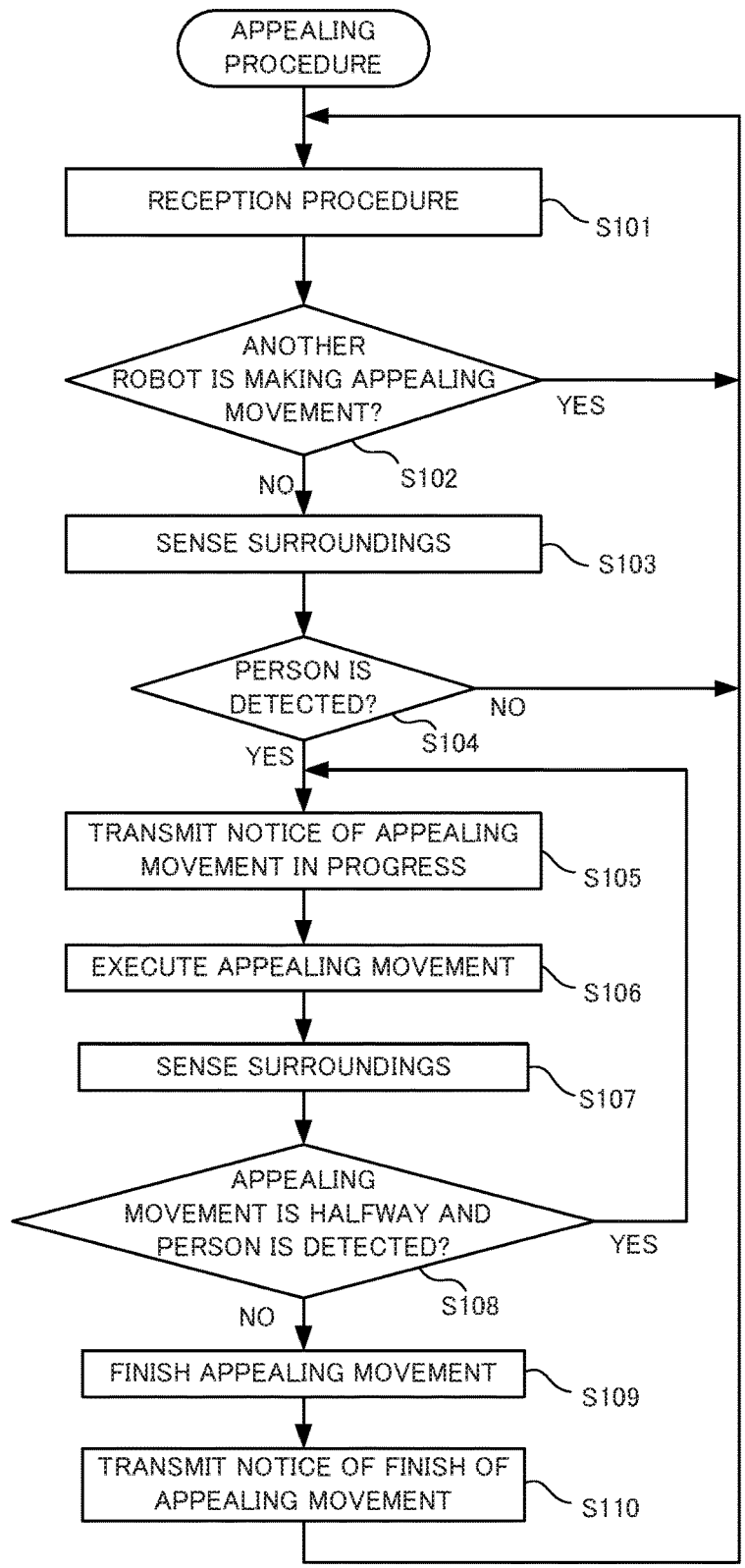
FIG. 3 is a flowchart of the appealing procedure of the robot according to Embodiment 1.

The configuration of the robot 100 according to Embodiment 1 is described above. The appealing procedure of the robot 100 will be described next with reference to FIG. 3. The appealing procedure is a procedure executed when an approaching person is detected for only one of multiple robots 100 to make an appealing movement to the person. As the robot 100 is activated, this procedure starts to run as a different thread from other threads necessary for the operation of the robot in parallel to the other threads.

First, the appeal notice receiver 112 of the robot 100 executes a reception procedure via the communicator 131 for checking whether there are transmission data from another robot 100 (Step S101). Then, the controller 110 determines whether the appeal notice receiver 112 has received an appeal notice and the received appeal notice is a notice of appeal in progress (Step S102). If a notice of appeal in progress is received (Step S102; Yes), the processing returns to the Step S101.

If the appeal notice received by the appeal notice receiver 112 is a notice of finish of appeal or the appeal notice receiver 112 fails to receive an appeal notice within a given time (for example, one minute) in the Step S101 (Step S102; No), the controller 110 makes the sensor group 120 sense the surrounding situation (Step S103). Then, the person detector 113 processes information sensed by the sensor group 120 to determine whether a person is around (Step S104).

If the person detector 113 determines that no one is around (Step S104; No), the processing returns to the Step S101. If the person detector 113 determines that a person is around (Step S104; Yes), the appeal notice transmitter 111 broadcasts a notice of appeal in progress to the other robots that are around via the communicator 131 (Step S105). The notice of appeal in progress is a notice to inhibit the other robots from making an appealing movement.

Then, the movement controller 114 controls the driver 132 and the like for the robot 100 to execute an appealing movement (Step S106). For this execution of an appealing movement, it may be possible to activate another thread dedicated to making an appealing movement and execute the thread in parallel.

Also during the appealing movement, the controller 110 makes the sensor group 120 sense the surrounding situation (Step S107) and the person detector 113 processes information sensed by the sensor group 120 to determine whether a person is still nearby (Step S108). Moreover, in the Step S108, the controller 110 also determines whether a series of appealing movements is finished (Step S108). If determined that an appealing movement is still halfway and a person is still nearby (Step S108; Yes), the processing returns to the Step S105 to continue the appealing movement. If determined that the appealing movement is finished or there is no one (gone somewhere) (Step S108; No), the appealing movement is finished (Step S109) and the appeal notice transmitter 111 broadcasts a notice of finish of appeal to the other robots that are around via the communicator 131 (Step S110). Then, the processing returns to the Step S101.

The appealing procedure of the robot 100 is described above. With this procedure, the robot 100 can make an appealing movement only when the other robots 100 are not making appealing movements. Therefore, even if multiple robots 100 are present, only one of them can make an appealing movement. Therefore, multiple robots 100 do not make appealing movements at the same time and an appealing movement is not buried in movements of multiple robots 100. Therefore, one robot 100 can make an effective appealing movement to a person who comes to see the robot 100.

Here, the other robots 100 do not need to stand still while one robot 100 is making an appealing movement. The other robots 100 may make natural movements to the extent of being unnoticeable. Here, the natural movements mean movements that are unnoticeable but living things do naturally or movements necessary for the robots 100 not to stop the function such as a movement looking like snoozing, a movement looking like breathing, and an operation to charge (an operation to move to a charging point and start charging).

Moreover, it may be possible that the appealing movements are classified by impact, the appealing movement executed in the above Step S106 is a high impact appealing movement, and the other robots 100 are allowed to make low impact appealing movements even if another robot 100 is making an appealing movement. Here, high impact appealing movements refer to movements to highly impress a person such as approaching a person and jumping with the tail wagging and low impact appealing movements refer to movements to less impress a person such as simply bowing on the site.

Modified Embodiment of Embodiment 1

Triggers for the robots 100 to make appealing movements and the contents of appealing movements may vary depending on the robot. For example, a robot A starts an appealing movement when the motion sensor detects a person approaching within one meter, a robot B starts an appealing movement when the camera detects being gazed by a person, a robot C starts an appealing movement when its name is called, and so on. Moreover, the contents of appealing movements can vary such as the robot A jumping, the robot B hesitating with a shy look, the robot C starting to say "Hello," and so on. In this way, it is possible to make the robots 100 behave as if they have personalities.

Embodiment 2

In Embodiment 1, the robot 100 is designed to start an appealing movement as soon as a person is detected when the other robots 100 are not making appealing movements. Therefore, for example, a robot 100 placed near the entrance in a hallway easily detects a person compared to the other robots 100 and thus is likely to make an appealing movement more frequently compared to the other robots 100. Then, Embodiment 2 in which multiple robots 100 are equalized in the frequency of making an appealing movement will be described.

The system configuration of a robot control system 1001 according to Embodiment 2 of the present disclosure is the same as that of the robot control system 1000 according to Embodiment 1 shown in FIG. 1. The functional configuration of a robot 101 according to Embodiment 2 is configured by, as shown in FIG. 4, adding a robot ID transmitter 115, a robot ID receiver 116, a robot ID storage 117, a leader flag 118, an appeal command transmitter 119, and an appeal command receiver 1110 to the robot 100 according to Embodiment 1 and eliminating the appeal notice transmitter 111 and the appeal notice receiver 112.

The robot ID transmitter 115 transmits to the other robots 101 that are around via the communicator 131 a list of the ID of its own device and the IDs of other robots 101 received by the robot ID receiver 116 described later. Here, the robot ID is a numeric value with which each robot can uniquely be identified and, for example, a media access control (MAC) address. The robot ID receiver 116 receives the ID list transmitted by the robot ID transmitter 115 of other robots 101 via the communicator 131. The robot ID storage 117 stores the ID list including the ID of its own device and the IDs of other robots 101 received by the robot ID receiver 116 as shown in FIG. 5A and FIG. 5B. The leader flag 118 indicates whether its own device is the leader robot among the multiple robots that are around. The leader flag 118 has an initial value of 0 and the leader flag 118 of a robot 101 determined to be the leader robot in the leader robot determination procedure described later is set to 1.

Moreover, the appeal command transmitter 119 is used by the leader robot to transmit to the other robots 101 via the communicator 131 an appeal start command to give a command to start an appealing movement and an appeal stop command to give a command to stop an appealing movement (collectively "the appeal command"). Then, the appeal command receiver 1110 receives the appeal command transmitted by the leader robot via the communicator 131. The robot having received an appeal start command transmitted by the appeal command transmitter 119 starts an appealing movement; therefore, the appeal command transmitter 119 functions as the appeal permitter.

Each robot executes the leader robot determination procedure to determine one leader robot among the multiple robots 101 during the initialization. Then, the robot 101 determined to be the leader robot commands the other robots 101 as to when to make an appealing movement and the robots 101 other than the leader robot do not make appealing movements until they receive a command from the leader robot. As a result, all robots have an equal chance to make an appealing movement.

Figure 6:
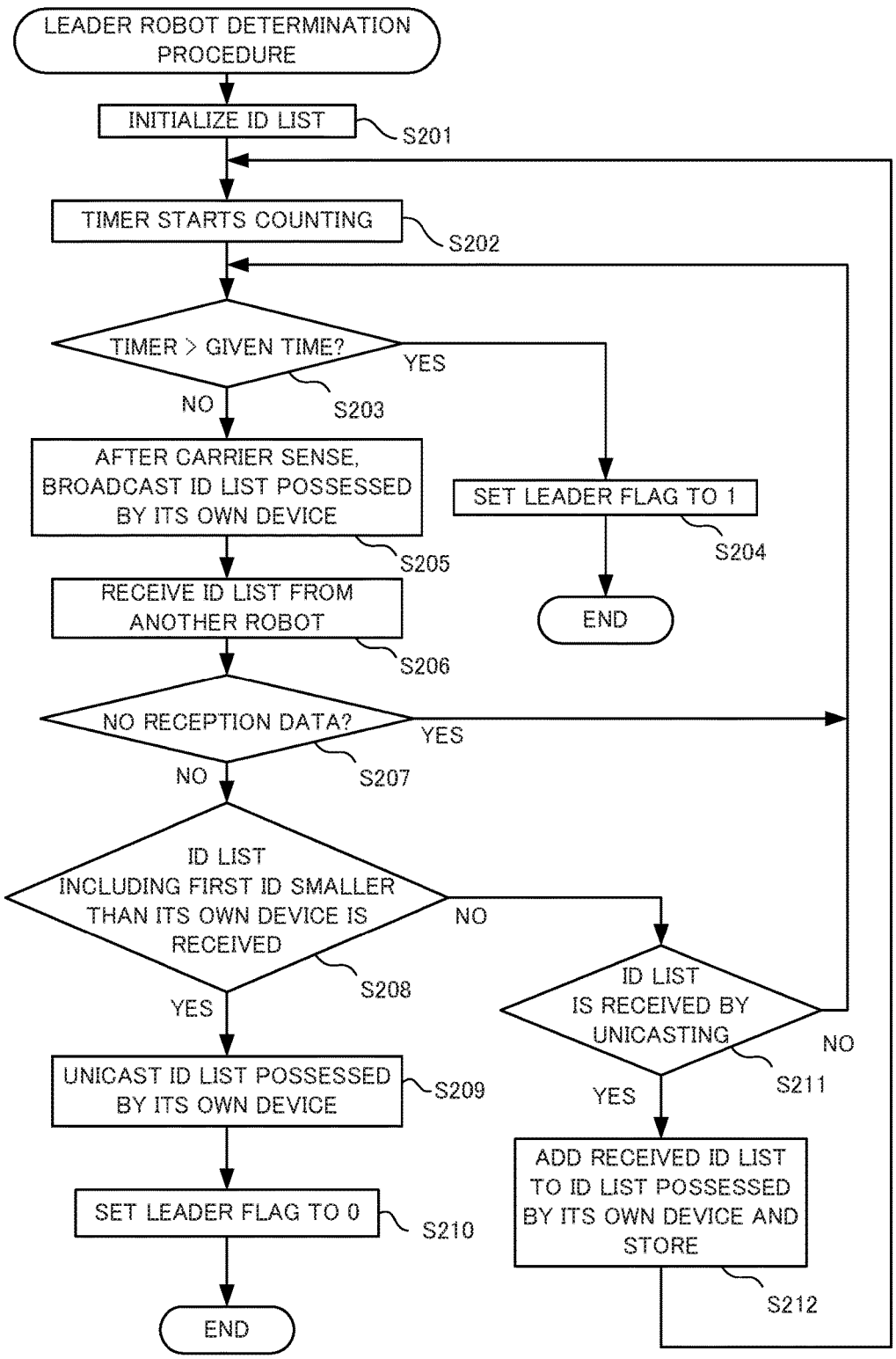
FIG. 6 is a flowchart of the leader robot determination procedure according to Embodiment 2.

As an example of the leader robot determination procedure of the robot 101, the procedure to determine a robot having the lowest ID to be the leader will be described with reference to FIG. 6. As the robot is activated, this procedure starts to run as one of initialization threads. First, the controller 110 stores only the ID of its own device in the robot ID storage 117 as shown in FIG. 5A to initialize the ID list (Step S201). Then, the controller 110 resets the timer and starts counting from zero (Step S202). Then, the controller 110 determines whether the value of the timer exceeds a given time (for example, three minutes) (Step S203). If exceeding the given time (Step S203; Yes), the controller 110 sets the leader flag 118 to 1 (Step S204) and ends the procedure.

If not exceeding the given time (Step S203; No), after confirming that there are no transmission data from another robot 101 via the communicator 131 (carrier sense), the robot ID transmitter 115 broadcasts the ID list stored in the robot ID storage 117 to the other robots 101 via the communicator 131 (Step S205). Although omitted in the flowchart of FIG. 6 because of complexity, if there are transmission data from another robot 101, the broadcasting by the robot ID transmitter 115 is skipped and the processing proceeds to Step S206.

Then, the robot ID receiver 116 receives an ID list transmitted by another robot 101 via the communicator 131 (Step S206). Here, when there are no reception data from another robot, the processing proceeds to Step S207, not waiting for the reception. Moreover, the ID list is received in the Step S206 in two different ways, reception by broadcasting and reception by unicasting. Then, the controller 110 determines whether reception data of an ID list from another robot are present in the Step S206 (Step S207). If there are no reception data (Step S207; Yes), the processing returns to the Step S203.

If there are reception data of an ID list (Step S207; No), the controller 110 determines whether the ID list received by the robot ID receiver 116 is an ID list received by broadcasting and the first ID on the list (the ID of the robot 101 having broadcasted the ID list) is smaller than the ID of its own device (Step S208). If the first ID on the received list is smaller than the ID of its own device (Step S208; Yes), the robot ID transmitter 115 unicasts the ID list stored in the robot ID storage 117 to the robot having the first ID on the list received by the robot ID receiver 116 in the Step S206 via the communicator 131 (Step S209). Then, the controller 110 sets the leader flag 118 to zero (Step S210) and ends the procedure.

On the other hand, if the ID list received by the robot ID receiver 116 in the Step S206 is not an ID list received by broadcasting or the first ID on the list (the ID of the robot 101 having broadcasted the ID list) is larger than the ID of its own device (Step S208; No), the controller 110 determines whether the ID list received by the robot ID receiver 116 in the step S206 is an ID list received by unicasting (Step S211). If not an ID list received by unicasting (Step S211; No), the processing returns to the Step S203.

If the ID list received by the robot ID receiver 116 in the Step S206 is an ID list received by unicasting (Step S211; Yes), the controller 110 adds and stores the ID list received by the robot ID receiver 116 in the robot ID storage 117 (Step S212). Then, the processing returns to the Step S202.

With the above procedure, each robot 101 adds an ID larger than the ID of its own device to the ID list. When a broadcast packet from a robot 101 having an ID smaller than the ID of its own device is received, the robot having transmitted the broadcast packet is a leader candidate. Then, the robot 101 transmits the entire ID list stored up to then to the leader candidate robot and stops broadcasting the ID list thereafter. Then, after being narrowed down to one leader candidate robot, there is no more broadcasting from the other robots 101 and after a given length of time has elapsed in the Step S203, the leader candidate robot 101 can recognize that there are no robots but its own device that serve as the leader. Then, the IDs of all robots 101 that are around are stored in the robot ID storage 117 of the leader-elect robot 101.

Here, the above leader robot determination procedure is given by way of example. Alternatively, for example, it is presumable that in place of the ID, the robots each generate a random number and the robot 101 of which the generated random number is the lowest in value is determined to be the leader robot. This procedure can be processed in the same processing flow as in the above description and in the flowchart shown in FIG. 6 provided that the term "ID" is replaced with the term "random number." However, taking into account the case in which multiple robots among the robots 101 generate the same random number that is the lowest, the processing of the Step S208 may be modified to "determine whether the first random number on the random number list received by broadcasting (the random number of the robot 101 having broadcasted the random number list) is equal to or lower than the random number of its own device." In this way, among the robots 101 having generated the lowest random number, the robot 101 broadcasting the random number list first becomes a leader robot candidate.

Moreover, as a simple method of determining the leader robot, it is presumable that the user manually sets one robot amount multiple robots 101 as the leader robot. This setting method presumably includes a method using a (not-shown) leader setting switch provided to the robot 101 (when the switch is on, the leader flag is set to 1) and a method of presetting the leader flag 118 of a leader robot to 1 and the leader flags of the other robots 101 to 0.

Figure 7:
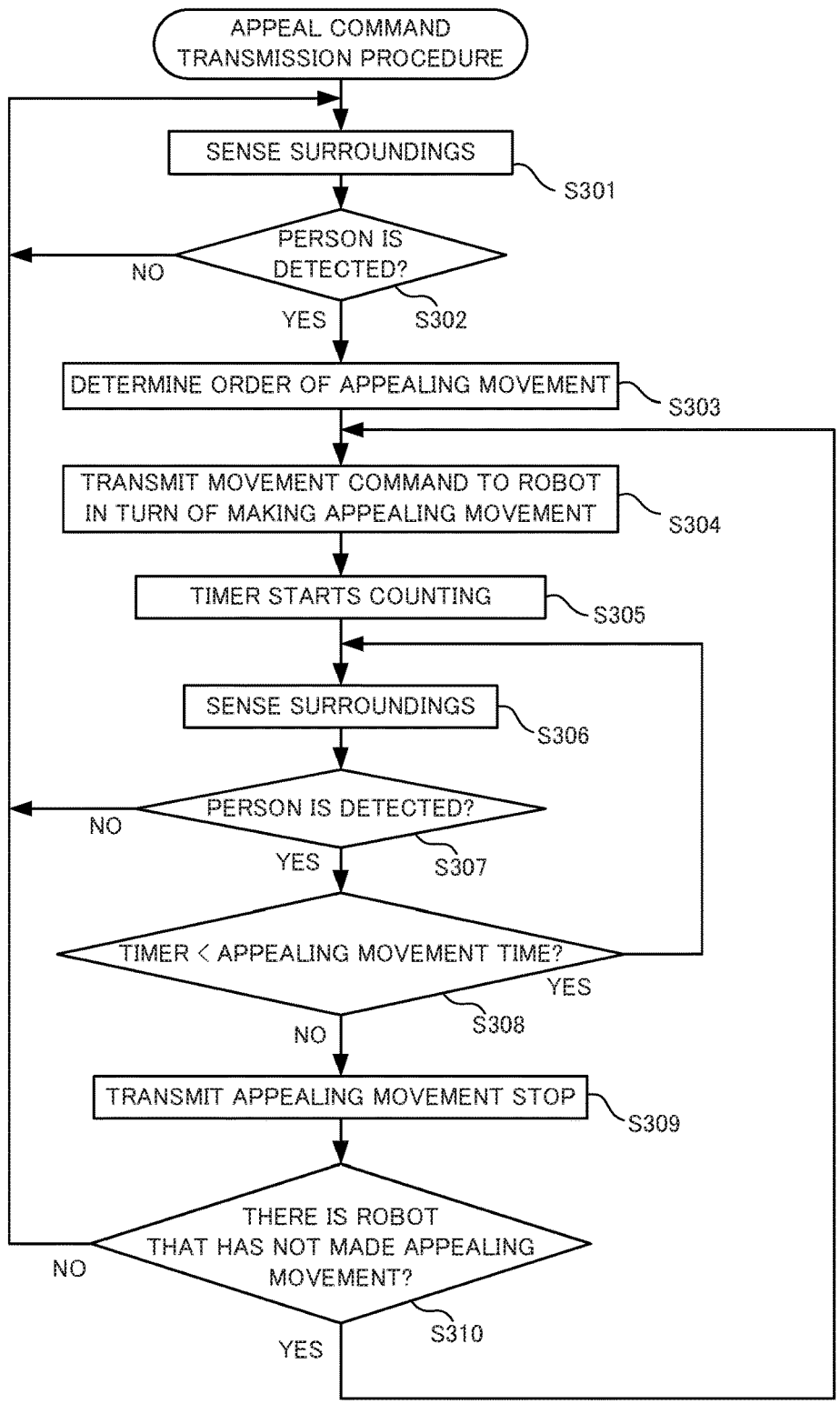
FIG. 7 is a flowchart of the appeal command transmission procedure of the leader robot according to Embodiment 2.

As the leader robot is determined, multiple robots 101 can be made to equally execute an appealing movement by the leader robot. The appeal command transmission procedure by the leader robot will be described with reference to FIG. 7. As the leader robot is determined, this procedure starts to run as a thread in the leader robot.

First, the controller 110 of the leader robot makes the sensor group 120 sense the surrounding situation (Step S301). Then, the person detector 113 processes information sensed by the sensor group 120 to determine whether a person is around (Step S302). If the person detector 113 determines that no one is around (Step S302; No), the processing returns to the Step S301. If the person detector 113 determines that a person is around (Step S302; Yes), the controller 110 determines the order of appealing movement of multiple robots 101 stored in the robot ID storage 117 (Step S303). The order can be determined using random numbers or the ascending order of IDs may be used. At this point, the controller 110 functions as the order determiner.

Then, according to the order determined in the Step S303, the appeal command transmitter 119 transmits an appeal start command to a robot 101 making an appealing movement next in the order via the communicator 131 (Step S304). Then, the controller 110 starts the timer counting (Step S305). Then, the controller 110 makes the sensor group 120 senses the surrounding situation (Step S306). Then, the person detector 113 processes information sensed by the sensor group 120 to determine whether a person is still there (Step S307). If the person detector 113 determines that no one is around (Step S307; No), the processing returns to the Step S301. If the person detector 113 determines that a person is around (Step S307; Yes), the controller 110 determines whether the value of the timer is lower than a given appealing movement time (Step S308). If the value of the timer is lower than the appealing movement time (Step S308; Yes), the processing returns to the Step S306. If the value of the timer is equal to or higher than the appealing movement time (Step S308; No), the appeal command transmitter 119 transmits an appeal stop command to the robot 101 to which an appeal start command is transmitted in the Step S304 via the communicator 131 (Step S309).

Then, the controller 110 determines whether there is a robot 101 that has not made an appealing movement according to the order determined in the Step S303 (Step S310). If there is no robot 101 that has not made an appealing movement, namely all robots 101 have made an appealing movement (Step S310; No), the processing returns to the Step S301. If there is a robot 101 that has not made an appealing movement (Step S310; Yes), the processing returns to the Step S304 to command the robot 101 next in the order to make an appealing movement.

Figure 8:
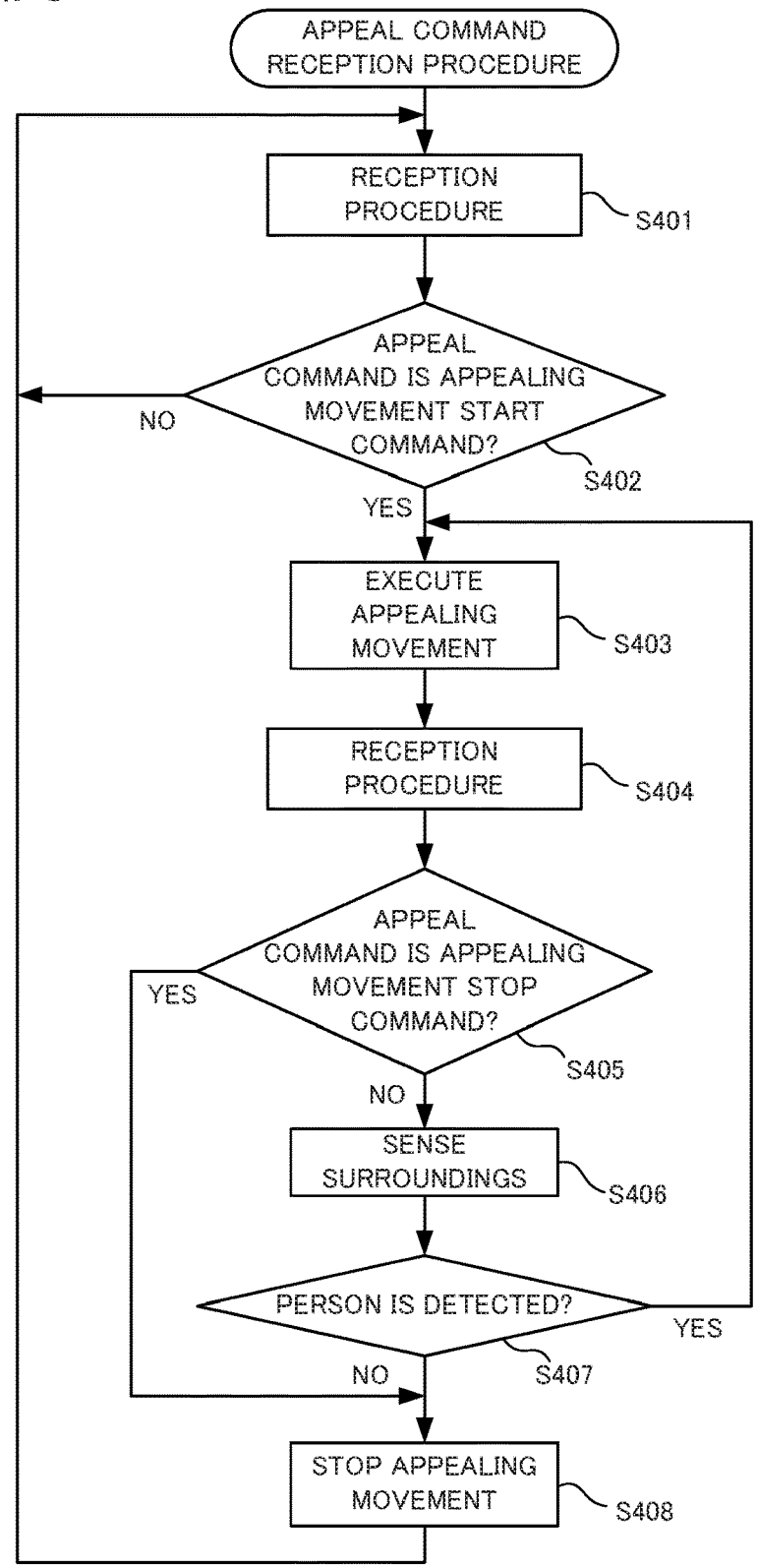
FIG. 8 is a flowchart of the appeal command reception procedure of the robot according to Embodiment 2.

With the above procedure, the leader robot can issue an appeal command to all robots 101 in order. The procedure for the robots 101 other than the leader robot to receive an appeal command and make an appealing movement will be described next with reference to FIG. 8. This appeal command reception procedure starts to run in the robots 101 of which the leader flag 118 is set to 0 at the end of the leader robot determination procedure. Moreover, the leader robot also activates a thread to execute the appeal command reception procedure when activating a thread to execute the appeal command transmission procedure.

First, the appeal command receiver 1110 executes the reception procedure via the communicator 131 for checking whether an appeal command is transmitted by the leader robot (Step S401). Here, while no appeal command is transmitted by the leader robot, the appeal command receiver 1110 waits until an appeal command is transmitted in the step S401. If an appeal command is transmitted by the leader robot, the appeal command receiver 1110 receives the appeal command. Then, the controller 110 determines whether the content of the appeal command received by the appeal command receiver 1110 is an appeal start command (Step S402). If not an appeal start command (Step S402; No), the processing returns to the Step S401.

If the content of the appeal command received by the appeal command receiver 1110 is an appeal start command (Step S402; Yes), the movement controller 114 controls the driver 132 and the like for the robot 101 to execute an appealing movement (Step S403). For this execution of an appealing movement, it may be possible to activate another thread dedicated to making an appealing movement and execute the thread in parallel.

Also during the appealing movement, the appeal command receiver 1110 executes the reception procedure via the communicator 131 for checking whether an appeal command is transmitted by the leader robot (Step S404), and the controller 110 determines whether the appeal command receiver 1110 has received an appeal command and the received appeal command is an appeal stop command (Step S405). If the appeal command received by the appeal command receiver 1110 is an appeal stop command (Step S405; Yes), the appealing movement is stopped (Step S408) and the processing returns to the Step S401.

If the appeal command receiver 1110 has received no appeal command or the received appeal command is not an appeal stop command (Step S405; No), the controller 110 makes the sensor group 120 sense the surrounding situation (Step S406), and the person detector 113 processes information sensed by the sensor group 120 to determine whether a person is still nearby (Step S407). If a person is still nearby (Step S407; Yes), the processing returns to the Step S403 to continue the appealing movement. If no one is nearby (Step S407; No), the appealing movement is stopped (Step S408) and the processing returns to the Step S401.

Here, if it is the leader robot's turn to make an appealing movement in the Step S304 of the appeal command transmission procedure, the leader robot transmits an appeal command from an ongoing thread to execute the appeal command transmission procedure to an ongoing thread to execute the appeal command reception procedure through inter-thread communication. At this point, the appeal command transmitter 119 and the appeal command receiver 1110 perform inter-thread communication within the controller 110 with no mediation of the communicator 131.

With the above-described appeal command transmission procedure and appeal command reception procedure, multiple robots 101 present can all make an appealing movement in order. Hence, all robots 101 can have an equal chance to make an appealing movement and the battery consumption of the robots 101 can be equalized.

Modified Embodiment of Embodiment 2

In Embodiment 2, the leader robot issues an appeal command to the robots 101 in order. Therefore, multiple robots 101 may execute a sequence of multiple appealing movements in order instead of the robots 101 each making an independent appealing movement. In order to realize this, the appeal command transmitted by the leader robot may include information as to which appealing movement is to make (what number of appealing movement in a sequence of multiple appealing movements). The robot 101 receiving such an appeal command makes the specified appealing movement based on information included in the appeal command, whereby a sequence of appealing movements is executed by multiple robots 101 in order.

Moreover, the number of robots 101 to which an appeal command is issued is not necessarily restricted to one. In some cases, an appeal command may be transmitted to two or three robots 101 at the same time. This is because in some cases, an appealing movement is more effective when several robots make appealing movements together than when a single robot makes an appealing movement.

Moreover, as in Embodiment 1, the appealing movements may be classified by impact. Then, it may be possible to command one robot 101 to make an appealing movement of the highest impact and the other robots to make low impact appealing movements.

Embodiment 3

In Embodiment 2, all robots 101 make an appealing movement in order and preference of an approaching person is not taken into account. However, when a person finds a robot he likes, presumably, the person often gazes at or hugs the robot. In such a situation, it is presumably effective that the robot he likes exclusively makes an appealing movement. Then, Embodiment 3 in which only the robot an approaching person shows interest in makes an appealing movement will be described.

Figure 9:
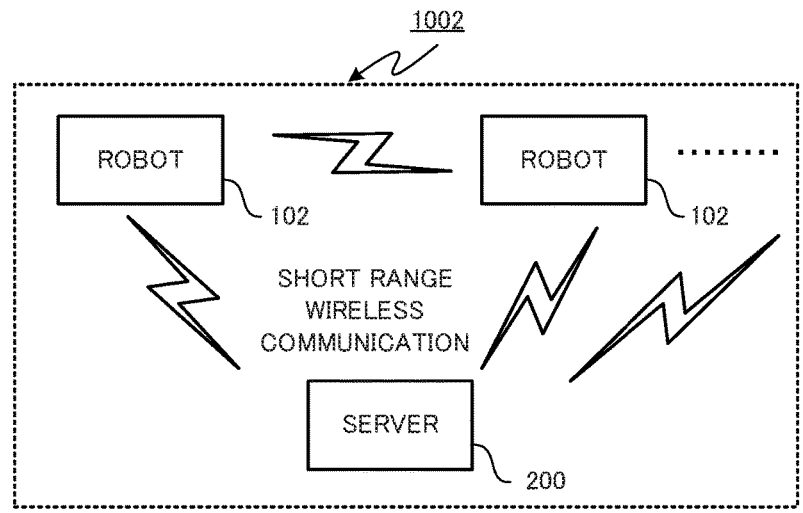
FIG. 9 is a diagram showing an exemplary configuration of the robot control system according to Embodiment 3 of the present disclosure.
Figure 10:
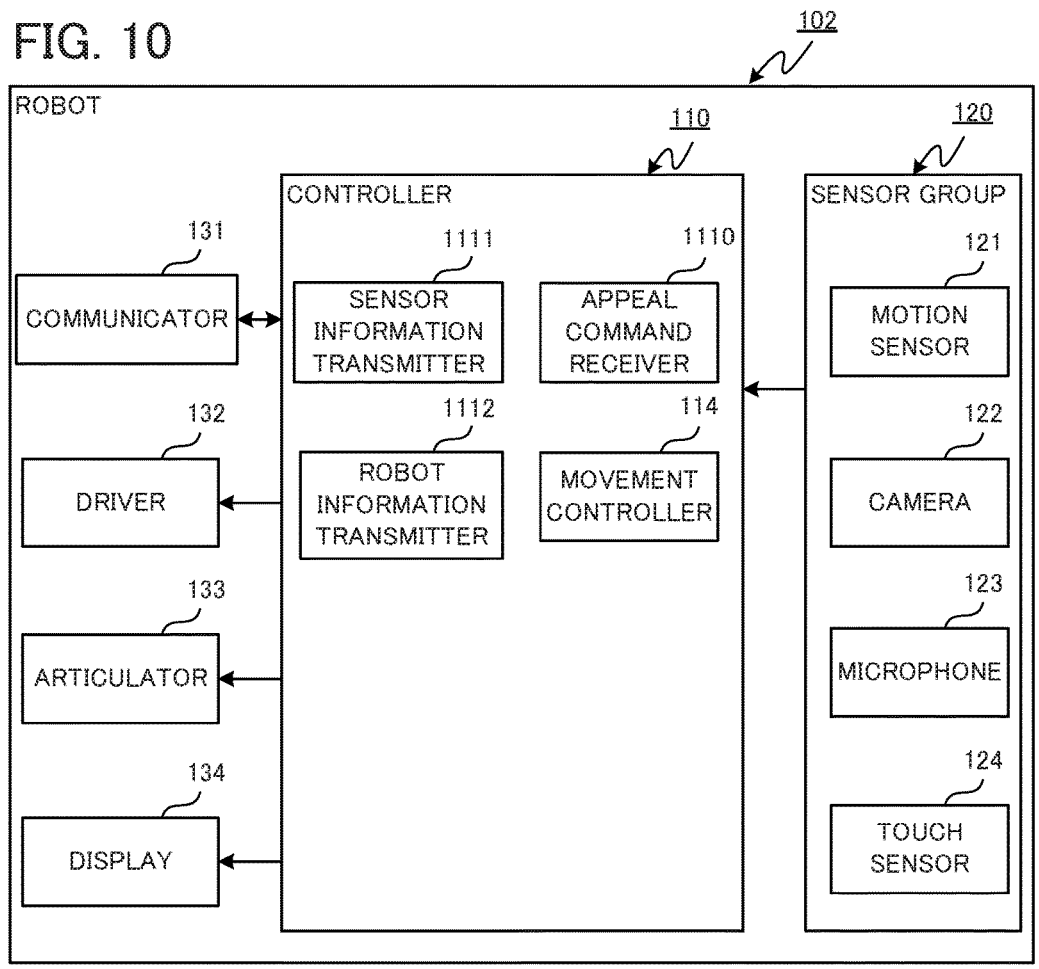
FIG. 10 is a block diagram showing the functional configuration of the robot according to Embodiment 3.

The system configuration of a robot control system 1002 according to Embodiment 3 of the present disclosure comprises, as shown in FIG. 9, a server 200 and multiple robots 102. Short range wireless communication is performed between the multiple robots 102 and between the robots 102 and the server. As a communication standard used in this short range wireless communication, for example, the BLE can be used as in Embodiment 1. The functional configuration of the robot 102 according to Embodiment 3 is configured by, as shown in FIG. 10, adding an appeal command receiver 1110, a sensor information transmitter 1111, and a robot information transmitter 1112 to the robot 100 according to Embodiment 1 and eliminating the appeal notice transmitter 111, the appeal notice receiver 112, and the person detector 113.

The appeal command receiver 1110 receives an appeal command transmitted by the server 200 via the communicator 131. The sensor information transmitter 1111 transmits information detected by the sensor group 120 to the server 200 via the communicator 131. The robot information transmitter 1112 transmits to the server 200 via the communicator 131 robot information regarding its own device (the type, ID, and the like of the robot). Here, the server 200 periodically broadcasts the address of its own device used in the short range communication. After activated, the robot 102 acquires the broadcasted address of the server 200 and the robot information transmitter 1112 transmits the robot information to that address via the communicator 131.

Figures 11, 12:
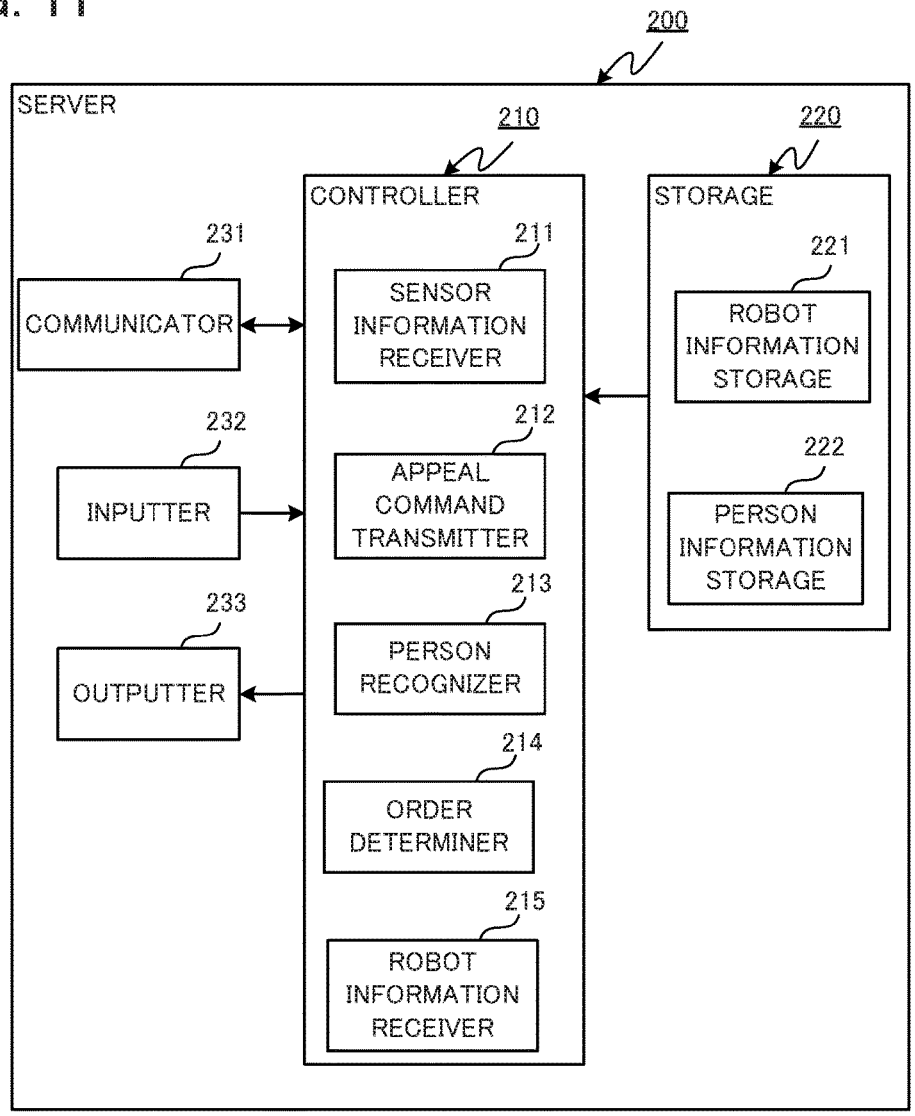
FIG. 11 is a block diagram showing the functional configuration of the server according to Embodiment 3.
FIG. 12 is a chart showing exemplary data stored in the robot information storage according to Embodiment 3.

The functional configuration of the server 200 according to Embodiment 3 comprises, as shown in FIG. 11, a controller 210, a storage 220, a communicator 231, an inputter 232, and an outputter 233.

The controller 210 comprises a processor such as a CPU and executes programs stored in the storage 220 to control the entire operation of the server 200. Moreover, the controller 210 has the capability of multithreading and can execute multiple threads (different processing flows) in parallel. Moreover, the controller 210 comprises a not-shown timer.

The storage 220 comprises a ROM and a RAM and stores programs executed by the controller 210 and necessary data.

The communicator 231 comprises an RF circuit, a BB circuit, an antenna, and the like, and performs short range wireless communication with the robots 102. The inputter 232 comprises, for example, a keyboard, a touch panel, and the like, and is an interface receiving user operations. The outputter 233 comprises a liquid crystal display (LCD), an electro-luminescence (EL) display, or the like.

The functional configuration of the controller 210 of the server 200 will be described next. The controller 210 functionally comprises a sensor information receiver 211, an appeal command transmitter 212, a person recognizer 213, an order determiner 214, and a robot information receiver 215.

The sensor information receiver 211 receives sensor information transmitted by the robots 102 via the communicator 231. The appeal command transmitter 212 transmits to the robots 102 via the communicator 231 appeal commands that are commands regarding appealing movements such as an appeal start command and an appeal stop command. The person recognizer 213 detects a person or recognizes a person based on the sensor information received by the sensor information receiver 211. Here, detecting a person means simply detecting the presence of some human and it is not sought out who he is. Then, recognizing a person means acknowledging that the person is someone seen before or a person seen for the first time by identifying features of the face, voice, and the like. The order determiner 214 determines to which robot 102 an appeal command is transmitted based on the sensor information received from the robots 102. The robot information receiver 215 receives the robot information transmitted by the robots 102 via the communicator 231.

Moreover, the storage 220 of the server 200 functionally comprises a robot information storage 221 and a person information storage 222.

The robot information storage 221 stores, as shown in FIG. 12, robot information received by the robot information receiver 215, sensor information received by the sensor information receiver 211, and the like. Explanation is given here based on the data presented in FIG. 12. The robot type is stored in a field "TYPE." FIG. 12 shows that a dog-type robot, a cat-type robot, and a bear-type robot are stored in the first, second, and third records, respectively. IDs with which the robots can uniquely be identified are stored in a field "ID." The IDs are, for example, MAC addresses. As described above, the server 200 periodically broadcasts the address of its own device and a robot 102 having received the address transmits robot information including the type and ID of the robot 102 to the server 200. The robot information receiver 215 of the server 200 receives the robot information via the communicator 231 and stores the robot information in the robot information storage 221. Fields "SENSOR INFORMATION," "PERSON DETECTION," and "DEGREE OF INTEREST" of the robot corresponding to robot information newly stored in the robot information storage 221 are empty at this point.

Sensor information transmitted by the robot 102 having the ID is stored in the "SENSOR INFORMATION." The sensor information includes infrared detection data acquired by the motion sensor 121, image data acquired by the camera 122, voice data acquired by the microphone 123, and contact detection data acquired by the touch sensor 124.

The result of determining whether a person is present based on the sensor information stored in the "SENSOR INFORMATION" is stored in the "PERSON DETECTION." A number "1" is stored when determined that a person is present and a number "0" is stored when determined that no one is present.

A value calculated based on the sensor information is stored in the "DEGREE OF INTEREST" as the degree of interest in the robot of a person who is around. The value of the degree of interest is increased when an approaching person is detected (by the motion sensor), a person gazing this way is detected (by the camera), a person saying something is detected (by the microphone), being hugged or stroked by a person is detected (by the touch sensor), or the like. The value of the degree of interest is low when those events are not detected. The value of the degree of interest is calculated by the order determiner 214; therefore, the order determiner 214 also functions as the degree-of-interest calculator.

Figures 13, 14:
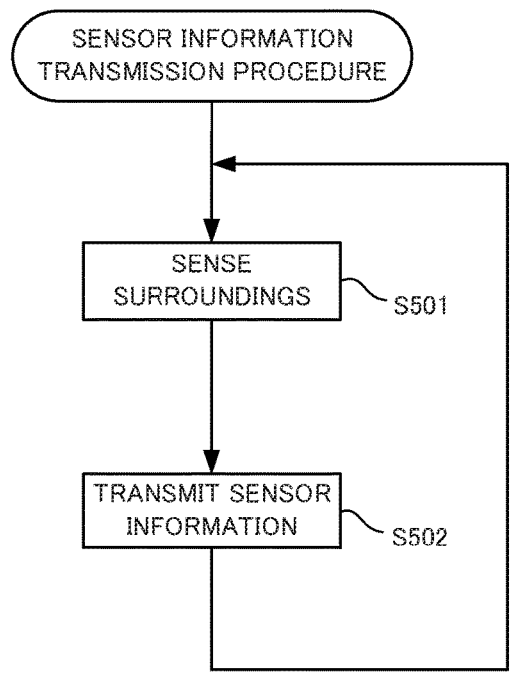
FIG. 13 is a chart showing exemplary data stored in the person information storage according to Embodiment 3.
FIG. 14 is a flowchart of the sensor information transmission procedure of the robot according to Embodiment 3.

The person information storage 222 stores, for each person recognized by the person recognizer 213, data of robots the person likes as shown in FIG. 13. Recognizing a person, the person recognizer 213 outputs an identification number for uniquely identifying the person and features data obtained from image data, voice data, and the like when the person is recognized, and their values are stored in the person information storage 222. Among other fields, the date/time when the person is most recently recognized is stored in a field "LAST UPDATE DATE/TIME." Then, the number of times of the person being recognized up to then is stored in a field "CUMULATIVE NUMBER OF TIMES." Moreover, sets of "type" and "degree of interest" stored in the robot information storage 221 at the last update date/time are stored in a field "DEGREE OF INTEREST." Here, sets of "ID" and "degree of interest" may be stored instead of the "type" and "degree of interest."

The configurations of the robot 102 and server 200 according to Embodiment 3 are described above. The sensor information transmission procedure and appeal command reception procedure of the robot 102 and the sensor information reception procedure and appeal command transmission procedure of the server 200 will be described next with reference to FIGS. 14 to 17. Sensor information transmitted in the sensor information transmission procedure of the robot 102 is received in the sensor information reception procedure of the server 200 and then, the server 200 can detect a person based on the sensor information and judge which robot 102 the person is interested in. Then, by commanding only the robot 102 the person is interested in to make an appealing movement, the robots 102 the person is not interested in make no appealing movement and only the robot 102 the person is interested in makes an appealing movement, whereby the appealing movement can effectively be made to the person.

First, the sensor information transmission procedure of the robot 102 will be described with reference to FIG. 14. After the robot 102 is activated, this procedure is activated as a thread after transmitting robot information to the server 200 and executed in parallel to other threads.

First, the controller 110 makes the sensor group 120 sense the surrounding situation (Step S501). Then, the sensor information transmitter 1111 transmits to the server 200 via the communicator 131 sensor information detected by the sensors provided to the sensor group 120 (the motion sensor 121, the camera 122, the microphone 123, and the touch sensor 124) (Step S502). Then, the processing returns to the Step S501.

With the above procedure, the robot 102 successively transmits sensor information detected by the parts of the sensor group 120 to the server 200, whereby the server 200 can constantly acquire the latest sensor information of the robot 102.

Figure 15:
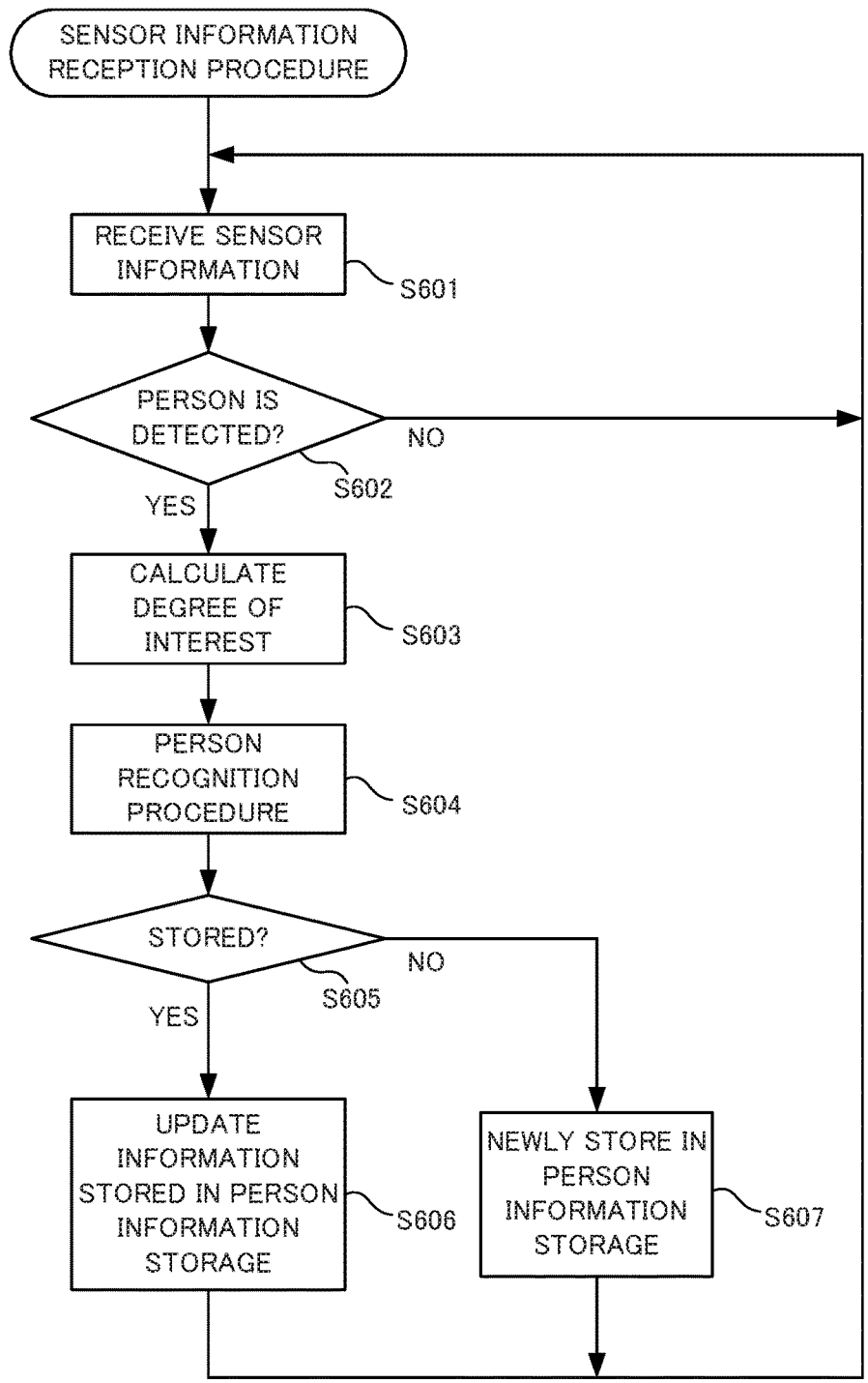
FIG. 15 is a flowchart of the sensor information reception procedure of the server according to Embodiment 3.

The procedure for the server 200 to receive the sensor information transmitted by the robot 102 in the above procedure (the sensor information reception procedure) will be described next with reference to FIG. 15. As the server 200 is activated, this procedure is activated as a thread and executed in parallel to other threads.

First, the sensor information receiver 211 receives the sensor information transmitted by the robot 102 via the communicator 231 (Step S601). While no sensor information is received, the sensor information receiver 211 waits until sensor information is received in the Step S601. The received sensor information is stored in the robot information storage 221. Then, the person recognizer 213 determines whether a person is present around the robot 102 having transmitted the sensor information based on the sensor information received by the sensor information receiver 211 (Step S602). The determination result is stored in the field "PERSON DETECTION" of the robot information storage 221. If the person recognizer 213 determines that no one is present (Step S602; No), the processing returns to the Step S601.

If the person recognizer 213 determines that a person is present (Step S602; Yes), the order determiner 214 calculates the degree of interest indicating how much the person is interested in the robot 102 based on the sensor information (Step S603). The calculated degree of interest is stored in the field "DEGREE OF INTEREST" of the robot information storage 221. Then, the person recognizer 213 recognizes the person based on the sensor information (Step S604). Then, the person recognizer 213 compares information recognized in the Step S604 with the features data stored in the person information storage 222 and determines whether the recognized person is a person already stored in the person information storage 222 (Step S605).

If the person recognized in the Step S604 is a person already stored in the person information storage 222 (Step S605; Yes), the person recognizer 213 updates information of the "degree of interest" stored in the person information storage 222 based on the "degree of interest" stored in the robot information storage 221 and the "cumulative number of times" stored in the person information storage 222, increments the "cumulative number of times," and reflects the current time on the "last update date/time" in the person information storage 222 (Step S606), and returns to the Step S601.

If the person recognized in the Step S604 is a person not yet stored in the person information storage 222 (Step S605; No), the person recognizer 213 stores in the person information storage 222 information of the person newly recognized this time (an identification number and features data) and information of the "degree of interest" stored in the robot information storage 221, stores "1" in the "CUMULATIVE NUMBER OF TIMES," and stores the current time in the "LAST UPDATE DATE/TIME" of the person information storage 222 (Step S607), and returns to the Step S601.

With the above procedure, information of the latest "person detection" and "degree of interest" is reflected on the robot information storage 221 of the server 200 and based on this, it can be judged which robot should be made to execute an appealing movement.

Figure 16:
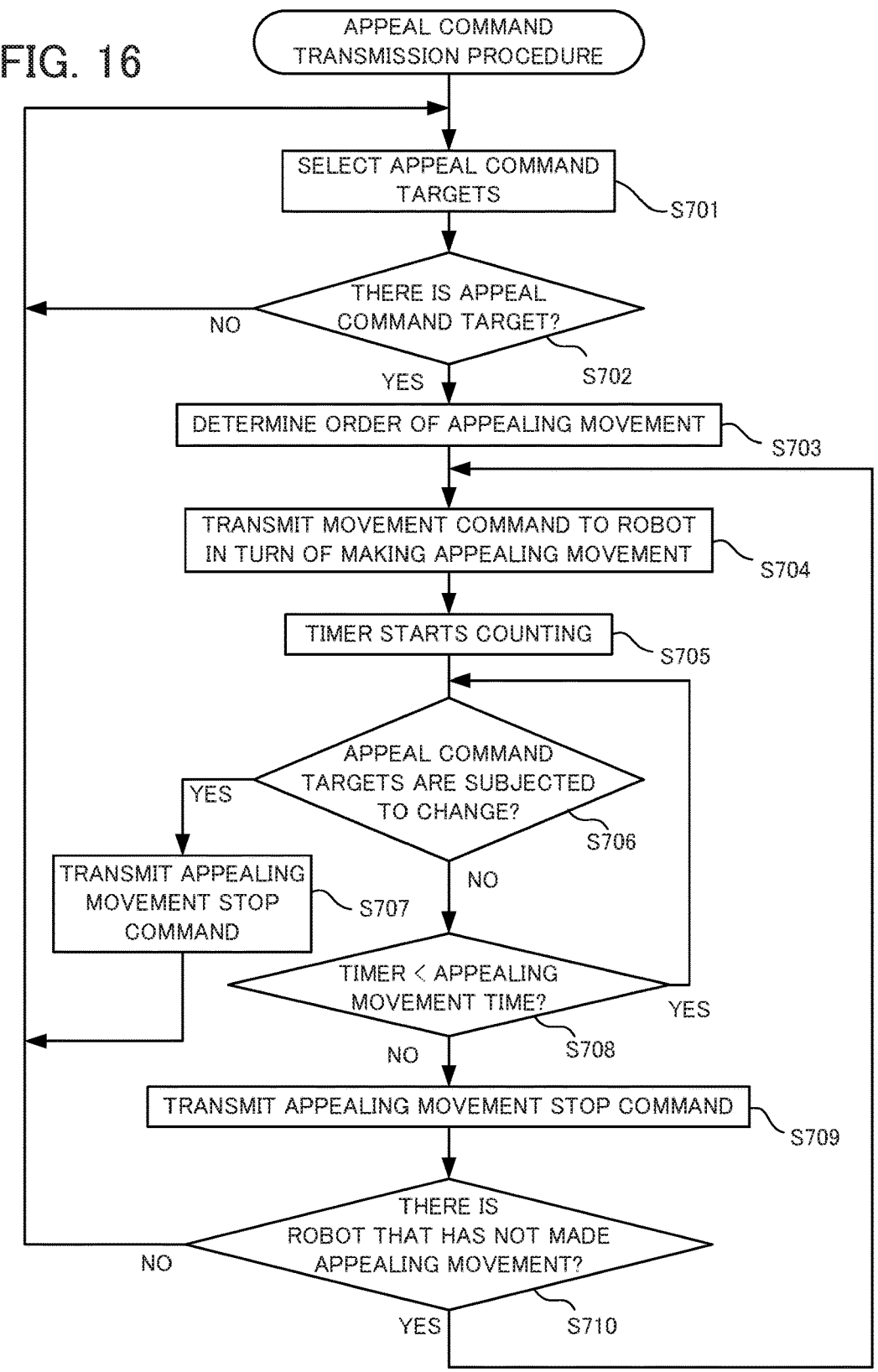
FIG. 16 is a flowchart of the appeal command transmission procedure of the server according to Embodiment 3.
Figure 17:
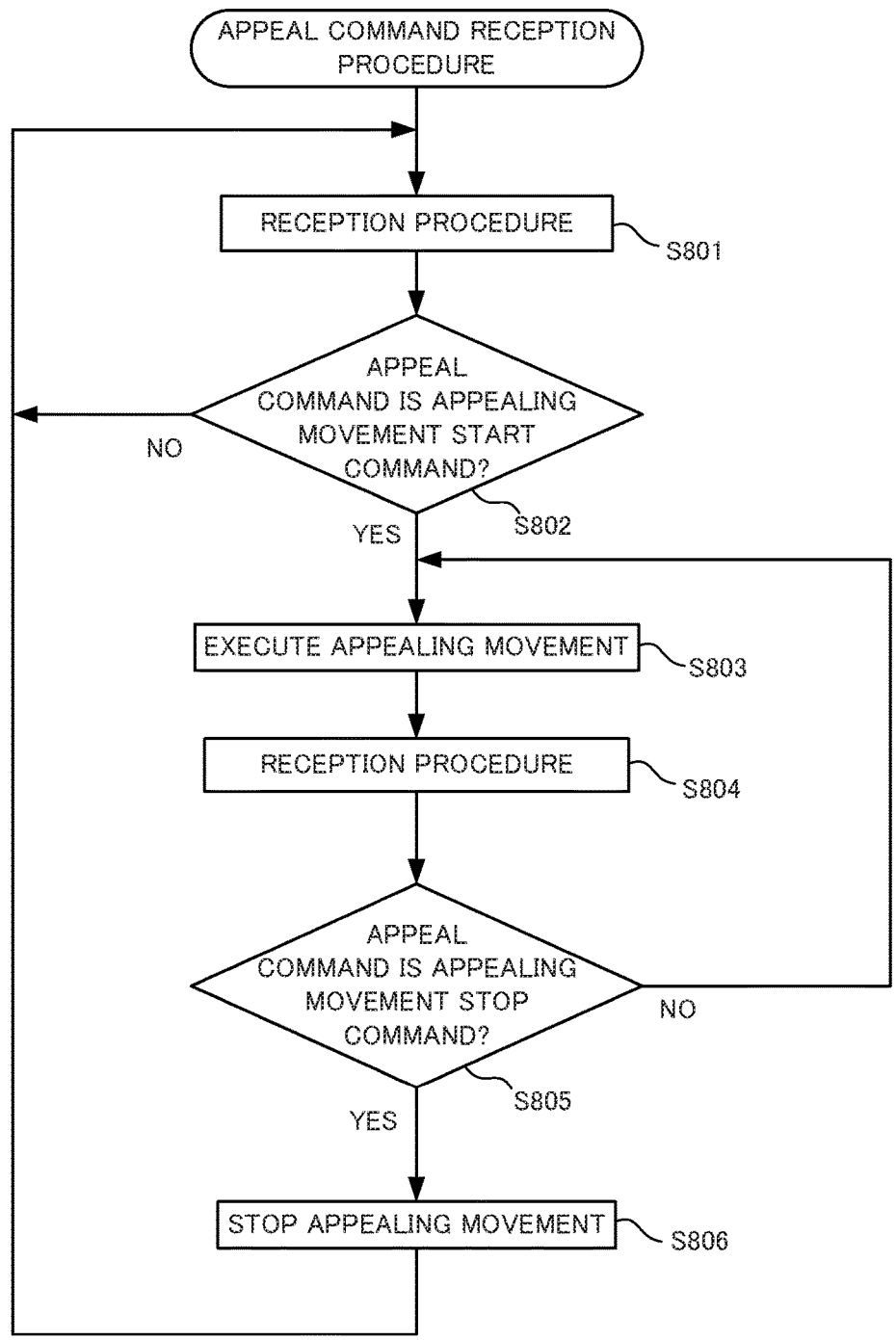
FIG. 17 is a flowchart of the appeal command reception procedure of the robot according to Embodiment 3.

The appeal command transmission procedure executed by the server 200 will be described next with reference to FIG. 16. As the server 200 is activated, this procedure is also activated as a thread and executed in parallel to other threads.

First, the order determiner 214 selects robots 102 to command to make an appealing movement based on information of the "person detection" and "degree of interest" stored in the robot information storage 221 and information of the "cumulative number of times" and "degree of interest" stored in the person information storage 222 (Step S701). For example, it is presumable that for a person whose cumulative number of times is higher than a first given number (for example, 10 times), the robots making an appealing movement are narrowed down to the robots 102 having a degree of interest equal to or higher than a given value (for example, 0.8); for a person whose cumulative number of times is between the first given number and a second given number (for example, 3 to 10 times), the robots 102 having a degree of interest not so high (for example, 0.3 and higher) are also eligible for an appealing movement (appeal command targets); and for a person whose cumulative number of times is lower than the second given number (for example, three times), all robots 102 are eligible for an appealing movement (appeal command targets).

Then, the order determiner 214 determines whether there are robots 102 eligible for an appealing movement (Step S702). For example, when the data stored in the field "PERSON DETECTION" of the robot information storage 221 are all "0," it is known that no one is around the robots 102 and there are no robots 102 eligible for an appealing movement in such a case. If there are no robots 102 eligible for an appealing movement (Step S702; No), the processing returns to the Step S701.

If there are robots 102 eligible for an appealing movement (Step S702; Yes), the order determiner 214 determines the order in which the robots 102 eligible for an appealing movement make an appealing movement one by one (Step S703). For example, it is presumable that the robots make an appealing movement in the descending order of degree of interest.

Then, according to the order determined in the Step S703, the appeal command transmitter 212 transmits an appeal start command to the robot 102 next in the order via the communicator 231 (Step S704). Then, the controller 210 starts the timer counting (Step S705).

Then, the order determiner 214 determines whether the robots 102 eligible for an appealing movement are subjected to change based on change in information of the "person detection" and "degree of interest" stored in the robot information storage 221 (Step S706). For example, when the person has left during the appealing movement or when his interest is shifted to another robot 102, the subsequent appealing movement will be wasted, whereby in such a case, it is determined that the robots 102 eligible for an appealing movement are subjected to change. If the robots 102 eligible for an appealing movement are subjected to change (Step S706; Yes), the appeal command transmitter 212 transmits an appeal stop command to the robot 102 to which an appeal start command is transmitted in the Step S704 via the communicator 231 (Step S707), and returns to the Step S701.

If the robots 102 eligible for an appealing movement are not subjected to change (Step S706; No), the controller 210 determines whether the value of the timer is lower than a given appealing movement time (Step S708). If the value of the timer is lower than the appealing movement time (Step S708; Yes), the processing returns to the Step S706. If the value of the timer is equal to or higher than the appealing movement time (Step S708; No), the appeal command transmitter 212 transmits an appeal stop command to the robot 102 to which an appeal start command is transmitted in the Step S704 via the communicator 231 (Step S709).

Then, the controller 210 determines whether there is a robot 102 that has not made an appealing movement according to the order determined in the Step S703 (Step S710). If there is no robot 102 that has not made an appealing movement, namely all robots 102 eligible for an appealing movement have made an appealing movement (Step S710; No), the processing returns to the Step S701. If there is a robot 102 that has not made an appealing movement (Step S710; Yes), the processing returns to the Step S704.

The appeal command transmission procedure by the server 200 is described above. The appeal command reception procedure for the robot 102 to receive an appeal command from the server 200 and make an appealing movement will be described next with reference to FIG. 17. After the robot 102 is activated, this procedure is activated as a thread after transmitting robot information to the server 200 and executed in parallel to other threads.

First, the appeal command receiver 1110 executes the reception procedure via the communicator 131 for checking whether an appeal command is transmitted by the server 200 (Step S801). Here, while no appeal command is transmitted by the server 200, the appeal command receiver 1110 waits until an appeal command is transmitted in the Step S801. If an appeal command is transmitted by the server 200, the appeal command receiver 1110 receives the appeal command. Then, the controller 110 determines whether the content of the appeal command received by the appeal command receiver 1110 is an appeal start command (Step S802). If not an appeal start command (Step S802; No), the processing returns to the Step S801.

If the content of the appeal command received by the appeal command receiver 1110 is an appeal start command (Step S802; Yes), the movement controller 114 controls the driver 132 and the like for the robot 102 to execute an appealing movement (Step S803). For this execution of an appealing movement, it may be possible to activate another thread dedicated to making an appealing movement and execute the thread in parallel.

Also during the appealing movement, the appeal command receiver 1110 executes the reception procedure via the communicator 131 for checking whether an appeal command is transmitted by the server 200 (Step S804), and the controller 110 determines whether the appeal command receiver 1110 has received an appeal command and the received appeal command is an appeal stop command (Step S805). If the appeal command received by the appeal command receiver 1110 is an appeal stop command (Step S805; Yes), the appealing movement is stopped (Step S806) and the processing returns to the Step S801.

If the appeal command receiver 1110 has received no appeal command or the received appeal command is not an appeal stop command (Step S805; No), the processing returns to the Step S803.

With the above procedure, only the robots 102 an approaching person is interested in can make an appealing movement in order, whereby more effective appealing can be made to that person. Then, the robots 102 selected according to the degree of interest and the like can all make an appealing movement in order, whereby the robots 102 can have an equal chance to make an appealing movement. Moreover, when the order of appealing movement is the descending order of degree of interest, it is possible to show the person an appealing movement of the robot 102 he is most interested in even if the person hurries away.

In addition, when there are multiple persons around the robot 102, processing for making the controller 110 control the driver 132 to execute an appealing movement towards the person who is interested in the robot 102 among the multiple persons can be realized by using a mechanism similar to that of the above embodiment 3.

Modified Embodiment of Embodiment 3

In Embodiment 3, the "cumulative number of times" indicating how many times a person comes to see a robot 102 is stored in the person information storage 222. Then, it is possible to make the person feel more personable by making the robot 102 utter a message according to the numeric value of the cumulative number of times. For example, the robot says "Nice to meet you" when the cumulative number of times is one and says "Thank you for coming to see me so many times" when the cumulative number of times is 10 or higher.

Moreover, it is possible to create an appealing movement based on past behavior of a person by storing his past behavior (for example, "gazing at," "calling out the name," "hugging," and the like) in the person information storage 222. For example, "Thank you for calling out my name the other day" or "Thank you for gazing at me the other day" can be said. With such appealing movements, it is possible to make the person feel more personable.

Moreover, as in Embodiments 1 and 2, the appealing movements may be classified by impact. Then, the robot 102 may be commanded to make an appealing movement of impact corresponding to the value of the degree of interest. For example, a robot 102 having the highest degree of interest is commanded to make an appealing movement of the highest impact and the other robots 102 are commanded to make lower impact appealing movements.

Embodiment 4

In the above embodiments, the controller 110 is notified via the communicator 131 that another robot is making an appealing movement. However, even without the communicator 131, the controller 110 may recognize that another robot is making an appealing movement through image recognition on an image captured by the camera 122. Such an Embodiment 4 will be described.

Figure 18:
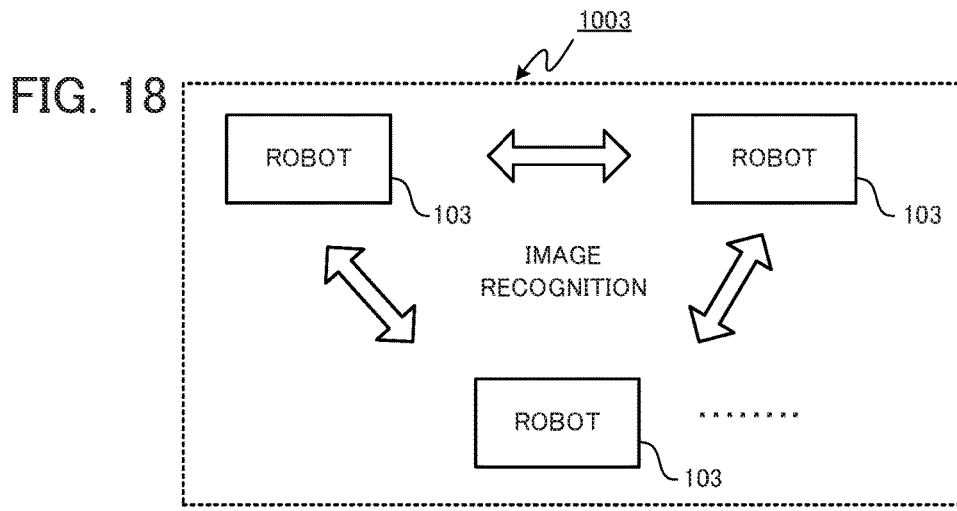
FIG. 18 is a diagram showing an exemplary configuration of the robot control system according to Embodiment 4 of the present disclosure.

As shown in FIG. 18, a robot control system 1003 according to Embodiment 4 of the present disclosure comprises multiple robots 103. Then, the multiple robots 103 mutually recognize their movements through image recognition.

Figure 19:
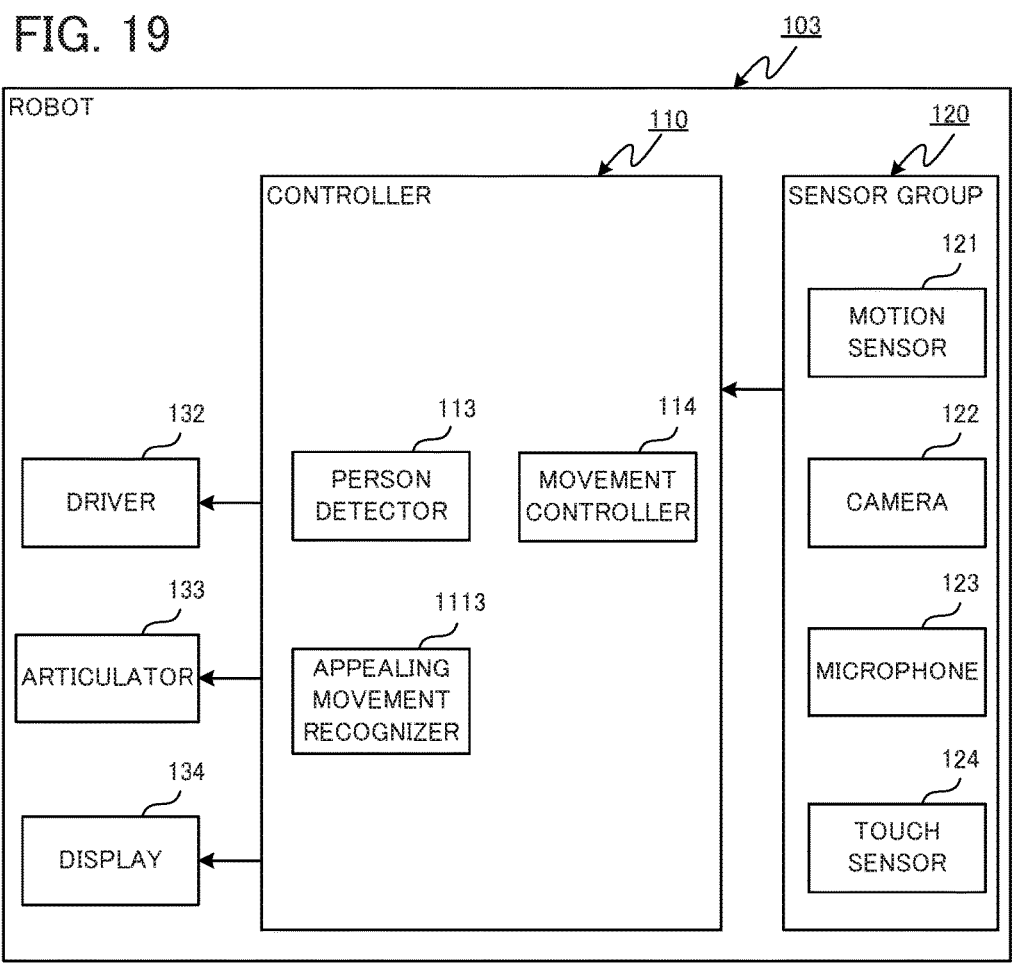
FIG. 19 is a block diagram showing the functional configuration of the robot according to Embodiment 4.

The functional configuration of the robot 103 according to Embodiment 4 will be described below. As shown in FIG. 19, the robot 103 is configured by eliminating the appeal notice transmitter 111, the appeal notice receiver 112, and the communicator 131 from the functional configuration of the robot 100 according to Embodiment 1 and adding an appealing movement recognizer 1113.

The appealing movement recognizer 1112 recognizes whether another robot 103 is making an appealing movement using an image captured by the camera 122. When the photographing direction of the camera 122 is limited, the driver 132 is used for rotational transfer so as to capture a 360-degree image around its own device.

The method of recognizing an appealing movement is determined on an arbitrary basis. For example, an appealing movement may be recognized based on a video image of another robot 103 or it may be possible to turn on an LED provided to the display 134 in a given color during an appealing movement and judge that another robot 103 is making an appealing movement if the camera 122 captures an image of the LED of the display 134 of the other robot 103 being lit in that color.

Figure 20:
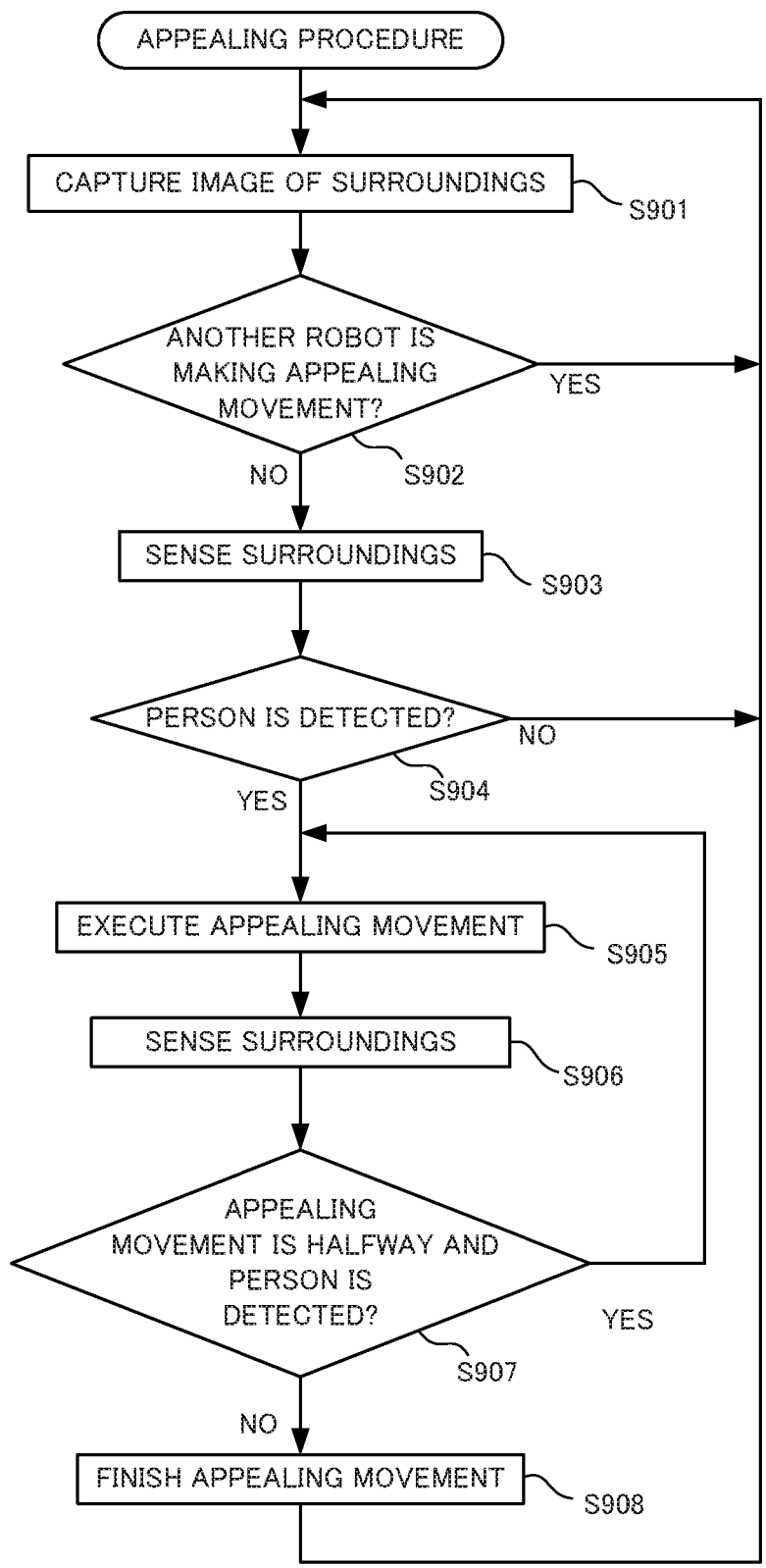
FIG. 20 is a flowchart of the appealing procedure of the robot according to Embodiment 4.

The appealing procedure of the robot 103 will be described next with reference to FIG. 20. As the robot 103 is activated, this procedure starts to run as a different thread from other threads necessary for the operation of the robot in parallel to the other threads.

First, the appealing movement recognizer 1112 of the robot 103 captures an image of the surroundings with the camera 122 for checking whether another robot 103 is making an appealing movement (Step S901). Then, the appealing movement recognizer 1112 recognizes an appealing movement of another robot 103 based on the image captured by the camera 122 and determines whether another robot 103 is making an appealing movement (Step S902). If determined to be making an appealing movement (Step S902; Yes), the processing returns to the Step S901.

If determined to be not making an appealing movement (Step S902; No), the controller 110 makes the sensor group 120 sense the surrounding situation (Step S903). Then, the person detector 113 processes information sensed by the sensor group 120 to determine whether a person is around (Step S904).

If the person detector 113 determines that no one is around (Step S904; No), the processing returns to the Step S901. If the person detector 113 determines that a person is around (Step S904; Yes), the movement controller 114 controls the driver 132 and the like for the robot 103 to execute an appealing movement (Step S905). For this execution of an appealing movement, it may be possible to activate another thread dedicated to making an appealing movement and execute the thread in parallel.

Also during the appealing movement, the controller 110 makes the sensor group 120 sense the surrounding situation (Step S906) and the person detector 113 processes information sensed by the sensor group 120 to determine whether a person is still nearby (Step S907). Moreover, in the Step S907, the controller 110 also determines whether a series of appealing movements is finished. If determined that the appealing movement is halfway and a person is still nearby (Step S907; Yes), the processing returns to the Step S905 to continue the appealing movement. If determined that the appealing movement is finished or there is no one (gone somewhere) (Step S907; No), the appealing movement is finished (Step S908) and the processing returns to the Step S901.

The appealing procedure of the robot 103 is described above. With this procedure, the robot 103 can make an appealing movement only when no other robots 103 are making an appealing movement. Therefore, even if multiple robots 103 are present, only one of them can make an appealing movement, whereby multiple robots 103 do not make appealing movements at the same time and an appealing movement is not buried in movements of multiple robots 103. Therefore, one robot 103 can make an effective appealing movement to a person who comes to see the robot 103.

Here, an individual movement of a robot is described.

When no one is present in the surroundings or when a robot 100 is not making an appealing movement, the movement controller 114 makes the robot 100 execute an individual movement. The individual movement is a voluntary movement a robot 100 executes on its own independently from a given target without communicating with a communication target such as a given target that is present around the robot. For example, animals such as the dog, the cat, or the like make some movements when they are on their own in the absence of humans or when they are in a group. Generally, people are comforted or enjoy themselves simply by watching such movements. Then, it is possible to program a natural movement imitating a pet and make a robot 100 execute the movement as an individual movement so as to increase the affection to the robot 100. Here, while one robot is making an appealing movement, the other robots may make individual movements.

Embodiments are described above. These embodiments including the modified embodiments can be combined as appropriate. For example, it may be possible in Embodiment 3 that the server 200 is eliminated and the leader robot in Embodiment 2 plays the role of the server 200 in Embodiment 3. In such a case, the robot serving as the leader robot has to comprise the functions provided to the server 200; however, with this configuration, the efficacy of Embodiment 3 can be obtained without the server.

Moreover, in Embodiment 3, a robot 102 having a higher degree of interest makes an appealing movement. However, conversely, it is possible to make a robot 102 having a lower degree of interest execute an appealing movement. In this way, it is presumably more likely that a person around the robots 102 lays eyes on a robot he is not interested in before.

Furthermore, it is possible that information on the unit sales, production volume, and the like of the robots is stored in the robot information storage 221 and the order determiner 214 selects the robots 102 eligible for an appealing movement by taking the information into consideration. In this way, for example, it is possible to intensively make a robot that is low in the unit sales execute an appealing movement to increase the sales.

Moreover, as an appealing movement, a robot may make an appealing movement for appealing another robot besides an appealing movement for appealing its own device. For example, in Embodiment 3, it is assumed that there are a robot A in which an approaching person has a higher degree of interest and robots B, C, and D in which the approaching person has lower degrees of interest. The server 200 may transmit an appeal command to command the robot A to make an ordinary appealing movement and the robots B, C, and D to make appealing movements for advertising the charm of the robot A.

Here, in the above-described Embodiments, as an exemplary communication standard of the short range wireless communication used by the communicators 131 and 231, the BLE standard is given. This is not restrictive. For example, the communicators 131 and 231 may perform wireless communication based on the Wi-Fi (registered trademark), the ZigBee (registered trademark), or the like. Moreover, the controller 110 may include the function of the communicator 131. Similarly, the controller 210 may include the function of the communicator 231.

Moreover, the robot according to the present disclosure may realize the functions of the robot by, for example, a computer executing programs. The programs for realizing the functions of the robot may be stored in a non-transitory computer-readable recording medium such as a universal serial bus (USB) memory, a compact disc-read only memory (CD-ROM), a digital versatile disc (DVD), a hard disk drive (HDD), and the like, or downloaded on a computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A robot, comprising:
   a detector configured to detect information on surroundings;
   a driver configured to drive the robot; and
   a controller configured to:
      determine whether a person is around and whether another robot executes an appealing movement attracting interest of the person based on the information detected by the detector;
      permit the robot to execute the appealing movement when determined that the person is around in the determination and that the another robot does not execute the appealing movement; and
      control the driver to execute the appealing movement when execution of the appealing movement is permitted.

2. The robot according to claim 1,
   wherein when determined that the person is around, the controller is configured to inhibit other robots from executing the appealing movement.

3. The robot according to claim 1, further comprising:
   a communicator configured to communicate with the another robot,
   wherein the controller is configured to:
      notify the another robot of execution of the appealing movement and finish of the appealing movement via the communicator;
      receive the another robot executing the appealing movement and having finished the appealing movement via the communicator; and
      permit execution of the appealing movement when finish of the appealing movement is received via the communicator.

4. The robot according to claim 1,
   wherein the controller is configured to:
      recognize that the another robot is executing the appealing movement and has finished the appealing movement; and
      when finish of the appealing movement is recognized, permit its own device execution of the appealing movement.

5. The robot according to claim 1,
   wherein the controller is configured to select either most intensive execution of an appealing movement or execution of a smaller appealing movement.

6. The robot according to claim 1,
   wherein the controller is configured to control the driver to execute a smaller appealing movement than the appealing movement when determined that the person is around based on the information detected by the detector but execution of the appealing movement is not permitted.

7. The robot according to claim 1,
   wherein the controller is configured to:
      store a cumulative number of times of the person coming to see the robot; and
      control the driver to execute an appealing movement corresponding to the stored cumulative number of times.

8. The robot according to claim 1,
   wherein the controller is configured to:
      store past behavior of the person to the robot; and
      control the driver to execute an appealing movement corresponding to the stored past behavior of the person.

9. The robot according to claim 1,
   wherein the controller is configured to make the robot execute an individual movement that is a voluntary movement its own device executes on its own when determined that no one is around based on the information detected by the detector or when execution of the appealing movement is not permitted.

10. A system comprising:
    the robot according to claim 1; and
    the another robot.

11. The robot according to claim 1, further comprising:
    one or more detectors configured to detect information on surroundings; and
    one or more of a first movable mechanism configured to be controlled to perform, as the appealing movement, a first predetermined movement and a first output device configured to be controlled to output, as the first appealing movement, a first predetermined output of sound, light or both,
    wherein the controller is configured to:
       recognize that the another robot is executing control of one or more of a second movable mechanism to perform a second predetermined movement and a second output device to output a second predetermined output of sound, light or both;
       recognize that the another robot has finished executing the control of the one or more of the second movable mechanism and the second output device;
       determine whether a person is within a predetermined distance of the one or more of the first movable mechanism and the first output device based on the information detected by the one or more detectors;
       in response to recognizing that the another robot has finished executing the control of the one or more of the second movable mechanism and the second output device, and determining that a person is within the predetermined distance, permit execution of control of the one or more of the first movable mechanism and the first output device; and in response to permitting execution of control of the one or more of the first movable mechanism and the first output device, control the one or more of the first movable mechanism to perform the first predetermined movement and the first output device to output the first predetermined output.

12. A robot control method comprising:
detecting a person;
determining whether another robot executes an appealing movement attracting interest of the person;
permitting the robot to execute the appealing movement when the person is detected and a determination is made that the another robot does not execute the appealing movement; and
controlling the robot to execute the appealing movement when execution of the appealing movement is permitted.

13. The robot control method according to claim 12, wherein the robot comprises:
one or more detectors configured to detect information on surroundings; and
one or more of a first movable mechanism configured to be controlled to perform, as the appealing movement, a first predetermined movement and a first output device configured to be controlled to output, as the appealing movement, a first predetermined output of sound, light or both, and
wherein the method further comprises:
recognizing that the another robot is executing control of one or more of a second movable mechanism to perform a second predetermined movement and a second output device to output a second predetermined output of sound, light or both;
recognizing that the another robot has finished executing the control of the one or more of the second movable mechanism and the second output device;
determining whether a person is within a predetermined distance of the one or more of the first movable mechanism and the first output device based on the information detected by the one or more detectors;
in response to recognizing that the another robot has finished executing the control of the one or more of the second movable mechanism and the second output device, and determining that a person is within the predetermined distance, permitting execution of control of the one or more of the first movable mechanism and the first output device; and
in response to permitting execution of control of the one or more of the first movable mechanism and the first output device, controlling the one or more of the first movable mechanism to perform the first predetermined movement and the first output device to output the first predetermined output.

14. A non-transitory computer-readable recording medium storing a program executable by a computer of a robot, the program configured to control the computer to function as:
a person detector detecting a person;
a determiner determining whether another robot executes an appealing movement attracting interest of the person;
an appeal permitter permitting the robot to execute the appealing movement when the person is detected and a determination is made that the another robot does not execute the appealing movement; and
a movement controller executing the appealing movement when execution of the appealing movement when execution of the appealing movement is permitted by the appeal permitter.

15. A robot comprising:
a detector configured to detect information on surroundings;
a driver configured to drive the robot; and
a controller configured to:
determine whether a person is around based on the information detected by the detector;
permit execution of the appealing movement to a person whose eye is caught by its own device when determined that multiple persons are present based on the information detected by the detector; and
control the driver to execute the appealing movement when execution of the appealing movement is permitted.

16. The robot according to claim 15, wherein when determined that a person is around based on the information detected by the detector, the controller is configured to permit execution of the appealing movement if there is no other robot executing the appealing movement.

17. A robot comprising:
a detector configured to detect information on surroundings;
a driver configured to drive the robot; and
a controller configured to:
determine whether multiple persons are around based on the information detected by the detector;
permit execution of an appealing movement attracting interest of a person when determined that the multiple persons are around in the determination;
calculate a degree of interest of each of the multiple persons in the robot; and
control the driver to execute the appealing movement towards the person of the multiple persons of which the calculated degree of interest is equal to or higher than a given value when execution of the appealing movement is permitted.

18. The robot according to claim 17, wherein the controller is configured to permit only one of the multiple robots present to execute the appealing movement in order to limit the number of robots executing the appealing movement to one.

19. The robot according to claim 18, wherein the controller is configured to:
determine an order of robots to execute the appealing movement; and
permit the robot to execute the appealing movement according to the determined order.

20. The robot according to claim 19, wherein the controller is configured to command each of the robots to execute a different appealing movement according to the determined order.

21. The robot according to claim 19, wherein the controller is configured to:
calculate a degree of interest of the person in each of the robots; and
permit the robots of which the calculated degree of interest is equal to or higher than a given value to execute the appealing movement.

* * * * *